US012381317B2

United States Patent
Litjes et al.

(10) Patent No.: US 12,381,317 B2
(45) Date of Patent: Aug. 5, 2025

(54) APPARATUS AND METHODS FOR OPTIMIZING COMBINED SENSING AND COMMUNICATIONS SYSTEMS

(71) Applicant: NXP B.V., Eindhoven (NL)

(72) Inventors: Alphons Litjes, Zijtaart (NL); Alexander Vogt, Hamburg (DE); Cristian Pavao Moreira, Frouzins (FR)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 18/310,848

(22) Filed: May 2, 2023

(65) Prior Publication Data
US 2023/0361464 A1 Nov. 9, 2023

(30) Foreign Application Priority Data
May 9, 2022 (EP) .................................... 22305687

(51) Int. Cl.
*H01Q 3/26* (2006.01)
*H01Q 3/30* (2006.01)

(52) U.S. Cl.
CPC ............. *H01Q 3/2694* (2013.01); *H01Q 3/30* (2013.01)

(58) Field of Classification Search
CPC ...... H01Q 3/2694; H01Q 3/30; H04B 7/0695; H04B 7/088; H04B 7/06952; H04B 7/06958; H04B 7/06956
See application file for complete search history.

(56) References Cited

U.S. PATENT DOCUMENTS

| | | | |
|---|---|---|---|
| 8,155,033 B2 | 4/2012 | Chaudhri et al. |
| 8,804,856 B2 | 8/2014 | Verhelst et al. |
| 9,791,551 B1 | 10/2017 | Eshraghi et al. |
| 9,971,414 B2 | 5/2018 | Gollakota et al. |
| 10,006,987 B2 | 6/2018 | Pavao-Moreira et al. |
| 10,103,772 B2 | 10/2018 | Pehlke et al. |
| 10,560,214 B2 | 2/2020 | Upescu et al. |
| 10,686,639 B2 | 6/2020 | Bose et al. |
| 10,764,832 B2 | 9/2020 | Comsa et al. |

(Continued)

FOREIGN PATENT DOCUMENTS

| CN | 106546980 A | 9/2018 |
|---|---|---|
| EP | 3451015 A1 | 3/2019 |

(Continued)

OTHER PUBLICATIONS

Sharetechnote, "5G/NR—Frame Structure," Website 2017; downloaded from the Internet Sep. 23, 2021; https://www.sharetechnote.com/html/5G/5G_FrameStructure.html.

(Continued)

*Primary Examiner* — Khanh C Tran

(57) ABSTRACT

Systems and methods are provided for performing both wireless communications and wireless sensing in combination. The systems include at least a first base station having at least one antenna device where the antenna device includes a beamformer control unit that uses a modifiable lookup table to control beam characteristics. The system may send a first set of electromagnetic sensing beams to a first environmental area within a field of view of the at least one antenna device to detect environmental objects within the environmental area. Based on data received by the antenna device, the system may generate a modified lookup table.

20 Claims, 13 Drawing Sheets

(56) References Cited

U.S. PATENT DOCUMENTS

| | | |
|---|---|---|
| 10,772,046 B2 | 9/2020 | Hwang et al. |
| 2008/0060024 A1 | 3/2008 | Decanne |
| 2016/0020737 A1 | 1/2016 | Kong et al. |
| 2016/0352374 A1 | 12/2016 | Wloczysiak |
| 2019/0075547 A1 | 3/2019 | Chae et al. |
| 2020/0103498 A1 | 4/2020 | Frank et al. |
| 2020/0154364 A1 | 5/2020 | Rahman et al. |
| 2020/0229102 A1 | 7/2020 | Gubeskys et al. |
| 2020/0271753 A1 | 8/2020 | Va et al. |
| 2021/0076417 A1 | 3/2021 | Bayesteh et al. |
| 2021/0195435 A1 | 6/2021 | Rimini et al. |
| 2022/0030440 A1 | 1/2022 | Park et al. |
| 2022/0035018 A1* | 2/2022 | Murakami ............... G01S 7/35 |
| 2022/0107384 A1 | 4/2022 | Duan et al. |
| 2022/0232524 A1 | 7/2022 | Kaikkonen et al. |
| 2022/0312232 A1 | 9/2022 | Nam et al. |
| 2023/0084692 A1 | 3/2023 | Luo et al. |
| 2023/0117789 A1 | 4/2023 | Vogt et al. |
| 2023/0122173 A1 | 4/2023 | Moreira et al. |
| 2023/0194656 A1 | 6/2023 | Song et al. |
| 2023/0309077 A1* | 9/2023 | Metwaly ............. H04W 72/046 |
| 2023/0341510 A1 | 10/2023 | Zou et al. |
| 2023/0344390 A1 | 10/2023 | Medra et al. |
| 2024/0340949 A1* | 10/2024 | Ding ..................... G01S 13/003 |

FOREIGN PATENT DOCUMENTS

| | | |
|---|---|---|
| EP | 3545335 A1 | 10/2019 |
| IN | 201647034086 A | 11/2016 |
| WO | 2018/097817 A1 | 5/2018 |
| WO | 2021/085768 A1 | 5/2021 |

OTHER PUBLICATIONS

3GPP TS 38.211, "3rd Generation Partnership Project; Technical Specification Group Radio Access Network; NR; Physical Channels and Modulation" specification, Release 16, V16.1.0 (Mar. 2020) pp. 1-130.

3GPP TS 38.211, "3rd Generation Partnership Project; Technical Specification Group Radio Access Network; NR; Physical Channels and Modulation" specification, Release 16, V16.2.0 (Jun. 2020) pp. 1-108.

3GPP TS 38.211, "3rd Generation Partnership Project; Technical Specification Group Radio Access Network; NR; Physical Channels and Modulation" specification, Release 16, V16.6.0 (Jun. 2021) pp. 1-134.

Liu, F. et al., "Joint Radar and Communication Design: Applications, State-of-the-Art, and the Road Ahead," IEEE Transactions on Communications, vol. 68, No. 6; Jun. 3, 2019; pp. 3834-3862.

Barneto, Carlos Baquero et al.: Full-Duplex OFDM Radar With LTE and 5G NR Waveforms: Challenges, Solutions, and Measurements, IEEE Transactions on Microwave Theory and Techniques, Oct. 1, 2019, pp. 4042-4054, vol. 67, No. 10, IEEE, Piscataway, NJ, USA.

Barneto, Carlos Baquero et al.: "High-Accuracy Radio Sensing in 5G New Radio Networks: Prospects and Self-Interference Challenge", 53rd Asilomar Conference on Signals, Systems, and Computers, Nov. 3, 2019, pp. 1159-1163, IEEE, Piscataway, NJ, USA.

Thorsten Wild et al.: "Joint Design of Communication and Sensing for Beyond 5G and 6G Systems," in IEEE Access, vol. 9, pp. 30845-30857, Feb. 15, 2021.

Kolodziej, Kenneth E. et al., "Adaptive Learning Rate Tuning Algorithm for RF Self-Interference Cancellation", IEEE Transactions on Microwave Theory and Techniques, Mar. 1, 2021, pp. 1740-1751, vol. 69, No. 3, IEEE, Piscataway, NJ, USA.

Tang, Aimin et al.: "Self-Interference-Resistant IEEE 802. 11ad-Based Joint Communication and Automotive Radar Design", IEEE Journal of Selected Topics in Signal Processing, Nov. 1, 2021, pp. 1484-1499, vol. 15, No. 6, IEEE, Piscataway, NJ, USA.

U.S. Appl. No. 17/932,966 Notice of Allowance dated Dec. 6, 2024; 10 pages.

82301534US02 Noticed of Allowance issued on Apr. 21, 2025, 10 pages.

U.S. Appl. No. 19/207,767 filed on May 14, 2025, 48 pages.

\* cited by examiner

APPARATUS AND METHODS FOR OPTIMIZING COMBINED SENSING AND COMMUNICATIONS SYSTEMS

CROSS-REFERENCE TO RELATED APPLICATIONS

This application claims priority under 35 U.S.C. § 119 to European Patent Application No. 22305687.0, filed on May 9, 2022, the contents of which are incorporated by reference herein.

FIELD OF THE DISCLOSURE

The present disclosure relates to systems and methods that perform wireless communication such as, for example, cellular communication, in combination with wireless sensing such as, for example, radar sensing, and more particularly to dynamically controlling the beamformer of a base station according to the information of the immediate environment obtained by the radar processing that is part of the combined sensing and wireless communication, or according to information obtained by sensing the location of active targets (for example, passive radar can be directed towards the location to get a more accurate view).

BACKGROUND OF THE DISCLOSURE

Modern wireless communication standards (from 5G onwards) extend operating frequencies to millimeter (mm) wave frequencies (e.g., >20 GHz). At such high frequencies, the wireless signals that are transmitted or received by communication systems may not only be used to perform wireless communications, but are also suitable for accurate range and velocity sensing. Indeed, radar services/functionality for range and velocity sensing is expected to be incorporated in 5G and 6G wireless communication systems and is currently being developed for WiFi 6. Yet, although various options are known for accomplishing both wireless communications and also wireless sensing in combination, such conventional options suffer from a number of disadvantages and inefficiencies.

For example, adding wireless sensing to communication systems may be achieved by time-division multiplex, frequency-division multiplex, or both. In any such circumstances, the bandwidth used for sensing reduces the amount of bandwidth that could have otherwise been sold for communication.

Additionally, for at least most applications of sensing functionality, an imaging radar is needed and a large field of view (FOV) has to be scanned, which takes a certain time and, thus, is limited in update rate. Performing accurate wireless sensing in combination with wireless communication may not only involve excessive latency, but also may be complicated by a need to perform wireless sensing/scanning in many directions at a given time so as to achieve a broad FOV. In particular, scanning a desired broad FOV in a complete manner may increase sampling time to an excessive extent. For example, for a velocity resolution of 1 km/h, performing a single observation by scanning a single direction with a 5G/6G base station may take about 20 ms for a 5G system and 5 ms for a 6G system. This means that a full cycle over a required FOV using 1000 observations will cost 5 to 20 seconds in which no communication is possible with the same hardware. Even in systems with multiple beams this may make the application unfeasible from a cost-point perspective.

Other concerns include system optimization, both with respect to system set-up and operation. For example, in systems that use base stations, it is desirable to reduce power consumption and the associated generated heat of the system. Additionally, setting up a communication network requires extensive simulation taking into consideration the three dimensional landscape surrounding each base station, especially in the mm Wave domain. The information needed for such simulations is typically hard to obtain or not available.

For at least one or more of these reasons, or one or more other reasons, it would be advantageous if new or improved systems and methods could be developed for achieving and optimizing systems that perform wireless communications in combination with wireless sensing, so as to address any one or more of the concerns discussed above or to address one or more other concerns or provide one or more benefits.

BRIEF DESCRIPTION OF THE DRAWINGS

Specific examples have been chosen for purposes of illustration and description, and are shown in the accompanying drawings, forming a part of the specification.

Figure 1:
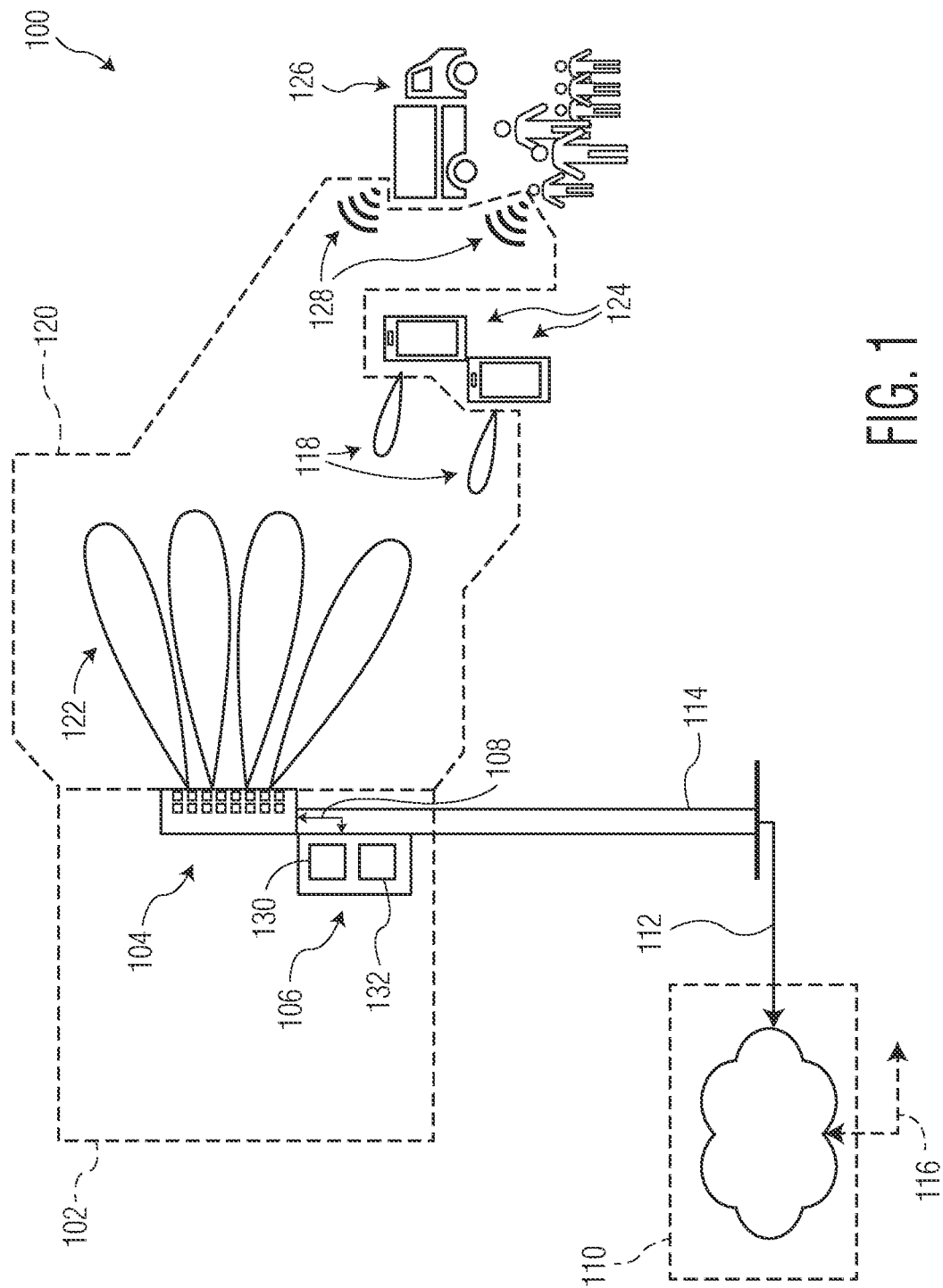
FIG. 1 is a block diagram of one embodiment of a system of the present technology for performing wireless sensing in combination with wireless communication.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

The present disclosure relates to systems and methods for performing wireless sensing, such as radar sensing, in combination with wireless communication, such as cellular communication, in a substantially concurrent or contemporaneous manner. In at least some embodiments, the systems and methods may be performed using one or more base stations operating at mm Wave frequencies, for example, in accordance with 5G, 6G, WiFi, and/or other (e.g., subsequent-generation) wireless communication technology standards. The systems and methods may include dynamically controlling the beamformer of at least one base station based on sensed information relating to environmental objects within the field of view of the at least one base station. In some examples, the beamformer may be controlled to alter one or more beam characteristics of one or more beams sent as a second set of electromagnetic sensing beams, as compared to the beam characteristics of a first set of electromagnetic sensing beams. Beam characteristics that may be altered include, for example, beam direction, beam width, and beam strength. In some examples, systems and methods of the present technology include obtaining sensed information relating to environmental objects within the respective fields of view of multiple base stations, and controlling the beamformer of at least one of the base stations based on the sensed information from the multiple base stations.

While various sensing procedures, or scanning, are discussed herein, and shown in the Figures, in two dimensions, it should be understood that all of the sensing procedures discussed herein may be conducted within the entire three dimensional field of view of any base station, or antenna device of a base station, and that any electromagnetic sensing beam may be scaled vertically as well as horizontally.

FIG. 1 is a block diagram that shows one embodiment of a system 100 that is configured to perform both wireless communications and wireless sensing in combination, in accordance with the present technology. As shown, the system 100 includes at least one base station (BS), which is shown as a first base station 102. The first base station 102 includes at least one antenna device 104 that generates electromagnetic beams 122. Each antenna device 104 may be an antenna in package (AiP) device. In at least some examples, the first base station 102 may include multiple antenna devices 104. Additionally, the first base station 102 also includes a control unit 106 that serves as a controller unit for the base station 102. The control unit 106 may include a remote radio unit (RRU) 130 and a baseband unit (BBU) 132. The RRU 130 may include a modem that performs modulation and demodulation, as well as other types of processing. The BBU may include an edge processing device that performs protocol control and other processing. The control unit 106 is coupled at least indirectly to the at least one antenna device 104, within the base station 102, by way of one or more communication links 108 that may be wired or wireless communication links. As used herein, when two devices are "coupled at least indirectly," they are operatively connected in a manner that allows signals, such as data and/or other communications, to be transferred from at least one of the devices to the other device, such as by way of one or more communication links that may be wired or wireless communication links.

Further, the system 100 may also include a cloud backend 110 that may be remotely located apart from the base station 102. In such examples, the base station 102 is coupled at least indirectly to the cloud backend 110 by way of one or more communication links 112 that may be wired or wireless communication links. In the illustrated example, the base station 102 is supported upon (and/or may be understood as including) a support structure 114, which may for example take the form of a pole or building. The communication links 112, particularly when wired, may extend from the control unit 106 to the cloud backend 110 via the support structure 114, although the communication links need not extend along the support structure 114 in other embodiments. The cloud backend 110 may have any suitable form, and, for example, may include a plurality of computer processors and storage devices. As represented by one or more additional communication links 116, the cloud backend 110 may also be coupled at least indirectly to one or more other base stations or other devices (not shown). Accordingly, the cloud backend 110 may pass communications between base stations, or to perform monitoring of, as well as control of, multiple base stations including the base station 102.

The system 100 may also include a radio frequency (RF) interface 120 by which the base station 102 both conducts wireless communications and performs wireless sensing. The RF interface 120 may include the wireless or electromagnetic fields or signals by which the base station 102 is in communication or contact with other devices, structures, or objects as described further below. Although the term RF interface 120 is utilized herein, the interface provided by such wireless or electromagnetic fields or signals may alternatively be referred to by other terms such as, for example, an antenna interface, or further for example, an air (or air gap) interface when the wireless or electromagnetic fields or signals are transmitted through the air or atmosphere (it should be appreciated that such fields or signals may also be transmitted within other physical environments or by way of other media or also transmitted through a vacuum). Among other things, in the illustrated embodiment, the RF interface 120 includes electromagnetic beams 122 that are generated by the at least one antenna device 104. While four of electromagnetic beams 122 are illustrated in FIG. 1, it should be understood that, depending upon the embodiment, any one or more electromagnetic beams may be generated and often many more than four electromagnetic beams may be generated by the at least one antenna device 104. In embodiments, such as the illustrated embodiment, in which there are multiple ones of the electromagnetic beams 122, one or more of those electromagnetic beams 122 may be utilized for communication purposes simultaneously (or substantially simultaneously) while one or more others of those electromagnetic beams may be used for wireless sensing purposes.

With respect to the generation of the electromagnetic beams 122 in the system 100, the base station 102 may employ phase-coded microwave waveform (PCMW) radar technology, which is well suited for integration into current cellular communication standards and is compatible with current 5G (as well as 6G) hardware (HW). The electromagnetic beams 122 are used both to achieve wireless communications with other communication devices 124 such as mobile devices, and also to detect or sense the presence of environmental objects 126, any of which may be static or dynamic with respect to the environmental area within the field of view of the base station 102. The other communication devices 124 as illustrated are intended to be representative of any of a variety of different types of mobile devices or other wireless communication devices including, for example, mobile phones, cellular phones, or laptop computers. The other communication devices 124 may be held by, or associated with, end users, and may thus be considered to be end user devices or considered to be representative of end users themselves. The environmental objects 126 may include any of a variety of devices, systems, apparatuses, or objects with which the base station 102 does not engage, or is not presently engaging, in wireless communications. The environmental objects 126 for example may include both inanimate objects, such as buildings or vehicles, and animate objects, such as people, animals, or vegetation such as bushes or trees. In some circumstances, one of more of the other communication devices 124 may be included among the environmental objects 126, such as when those other communication devices are shut off (and are therefore not engaging in wireless communications with the base station 102).

With respect to wireless communications between the base station 102 and the other communication devices 124, it should be recognized that such wireless communications may include both transmissions from the base station 102 to the other communication devices 124, as represented by the outgoing electromagnetic beams 122, as well as transmissions from the other communication devices back to the base station 102, which are illustrated in FIG. 1 as returning electromagnetic beams 118. That is, the other communication devices 124 are active targets that send transmissions to the base station 102, in addition to receiving the outgoing transmissions sent by the base station 102. The transmissions from the base station 102 to the other communication devices 124 may be referred to as downlink (DL) communications and the transmissions from the other communication devices 124 back to the base station 102 may be referred to as uplink (UL) communications. It should be appreciated that the RF interface 120, in addition to including the electromagnetic beams 122, also may be considered to include the additional electromagnetic beams 118.

With respect to wireless sensing performed by the base station 102, the environmental objects 126 are passive targets that do not generate their own transmissions, but reflect sensing signals sent by the base station 102. Accordingly, wireless sensing by the base station 102 includes both the sending of electromagnetic sensing beams from the at least one antenna device 104 outward from the base station 102, as represented by the outgoing electromagnetic beams 122, toward the environmental objects 126, and the receiving of reflections of those sensing signals back from the environmental objects 126. The reflected sensing signals that reflect off the environmental objects 126 and are received by the at least one antenna device 104 are illustrated in FIG. 1 as reflected sensing signals 128, which may also be considered to form part of the RF interface 120.

In system 100, the wireless communications between the base station 102 and the other communication devices 124 may occur in a simplex manner. That is, the DL transmissions from the base station 102 to the other communication devices 124 may occur at different times than the UL transmissions from the other communication devices 124 to the base station 102. In contrast, during wireless sensing, the sending of sensing signals from the at least one antenna device 104 and receiving of the reflected signals 128 may occur in a duplex manner in which there is coherent transmission and reception. That is, the receiving of respective ones of the reflected signals 128 may occur at the same or substantially the same times, respectively, as the sending of respective ones of the sensing signals that give rise to those respective reflected signals. In alternate embodiments encompassed herein, however, it is also possible that the wireless communications between the base station 102 and the other communication devices 124 may occur in a duplex manner.

In some embodiments, the RF interface 120, other communication devices 124, environmental objects 126, and cloud backend 110 may all constitute parts of the system 100 in addition to the base station 102, as well as one or more other base stations with which the cloud backend 100 is also in communication. However, it should be appreciated that the extent of the system 100 may be defined differently depending upon the embodiment or circumstances. For example, the system 100 may be understood to include only the first base station 102 and the cloud backend 110, with or without one or more other base stations with which the cloud backend is also in communication, or alternatively understood to include only the first base station 102. In at least some embodiments encompassed herein, the methods of performing both wireless communications and wireless sensing in combination, in a substantially concurrent or contemporaneous manner, primarily (or exclusively) involve operations or manners of operation performed by the base station 102.

In at least some examples, systems of the present technology, such as system 100, may perform wireless communications and wireless sensing in a time multiplexed manner. However, other form of multiplexing may be used in alternative examples. Time multiplexing may be accomplished in any suitable manner, such as by interleaving communication functionality and sensing functionality on a sub-frame level, such as described in European Patent Application No. 21306455.3, filed on Oct. 18, 2021, which is hereby incorporated by reference herein. For example, multiple wireless communication operations and wireless sensing operations may be assigned to be performed during respective time periods within slots, referred to as symbols, in a time-multiplexed manner. The various symbols that are assigned for wireless communication operations and wireless sensing operations may be combined in a structured manner, and may be distributed in a variety of different manners. Time-multiplexed approaches allows for wireless communication symbols and wireless sensing symbols, and corresponding wireless communication operations and wireless sensing operations, to be dedicated to particular time periods and performed in a flexible manner, so as to fulfill different use case requirements and communication requirements. Additionally, time-multiplexed approaches also allow for flexible modification of the duty cycle of wireless sensing and wireless communication operations and thereby enables telecommunications providers to trade off excess communication bandwidth with increased sensing capabilities.

Figure 2:
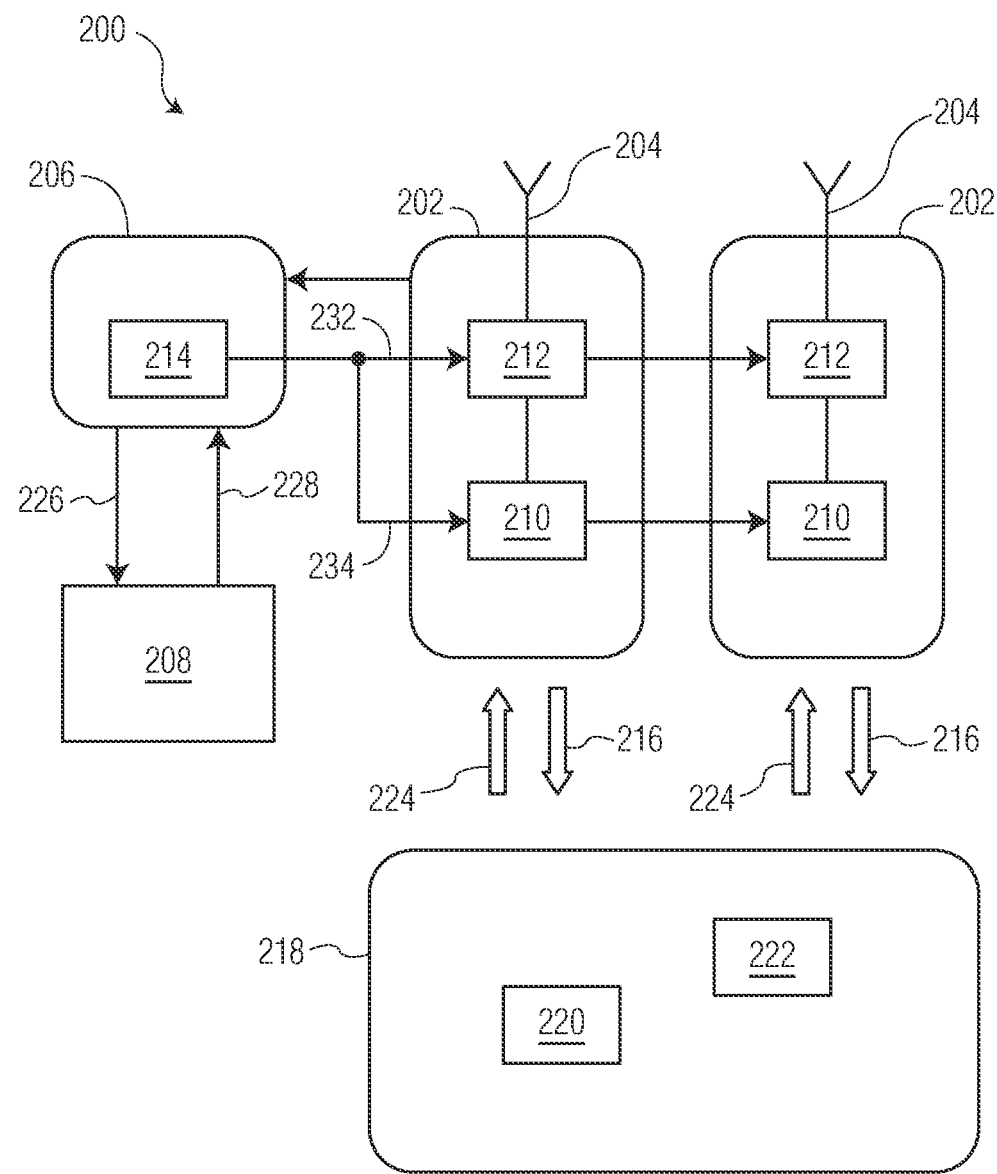
FIG. 2 is a block diagram of one embodiment of an antenna device and a base station control unit of the present technology, which may be used in the system of FIG. 1.

FIG. 2 is a block diagram that shows one embodiment of an antenna device 200, which may be (or may be included in) the at least one antenna device 104 of the system 100, and a base station control unit 208, which may be the base station control unit 106 of the system 100. The antenna device 200 includes at least one beamformer 202, and in the present example embodiment includes a plurality of (e.g., two) the beamformers 202. Each of the beamformers 202 includes a respective adjustable phase shifter 210 and a respective adjustable amplifier 212. Also, the antenna device 200 also includes respective antennas 204 coupled at least indirectly to the respective beamformers 202. Further, the antenna device 200 also includes a beamformer control unit 206 that is coupled at least indirectly to each of the beamformers 202 and, more particularly, coupled at least indirectly to each adjustable phase shifter 210 and each adjustable amplifier 212 of each of the beamformers. Additionally, the beamformer control unit 206 is also coupled at least indirectly to a base station control unit 208.

The respective adjustable phase shifter 210 of each of the beamformers 202 controls the phase setting, or beam direction, and the element configuration, or beam width, of one or more respective electromagnetic sensing signal(s) 216 generated by the beamformer 202. The respective adjustable phase shifter 210 of each of the beamformers 202 is adjustable by the beamformer control unit 206 to any of a plurality of phase settings, which may include any of a plurality of beam directions and a plurality of beam widths. The beam directions may include any angle within the field of view of the antenna device 200, which may be from 0° to 360°, but is often less than 360°, and in at least some examples is from 0° to 180° or an angle less than 180°. The beam widths may include any beam width, from very wide beams to very narrow beams. The beam direction and beam width may be set independently to provide any combination of beam direction and beam width for any given electromagnetic beam.

The respective adjustable amplifier 212 of each of the beamformers 202 controls the gain setting, also known as the power level or strength of the beam. The respective adjustable amplifier 212 of each of the beamformers 202 is adjustable by the beamformer control unit 206 to any of a plurality of amplifier settings. The amplifier settings may include on, off, and a plurality of power settings that each correspond to a beam strength. The beam strength may be varied from a minimum strength to a maximum strength, and the maximum strength will vary depending upon the capabilities of the adjustable amplifier 212.

Figure 3A:
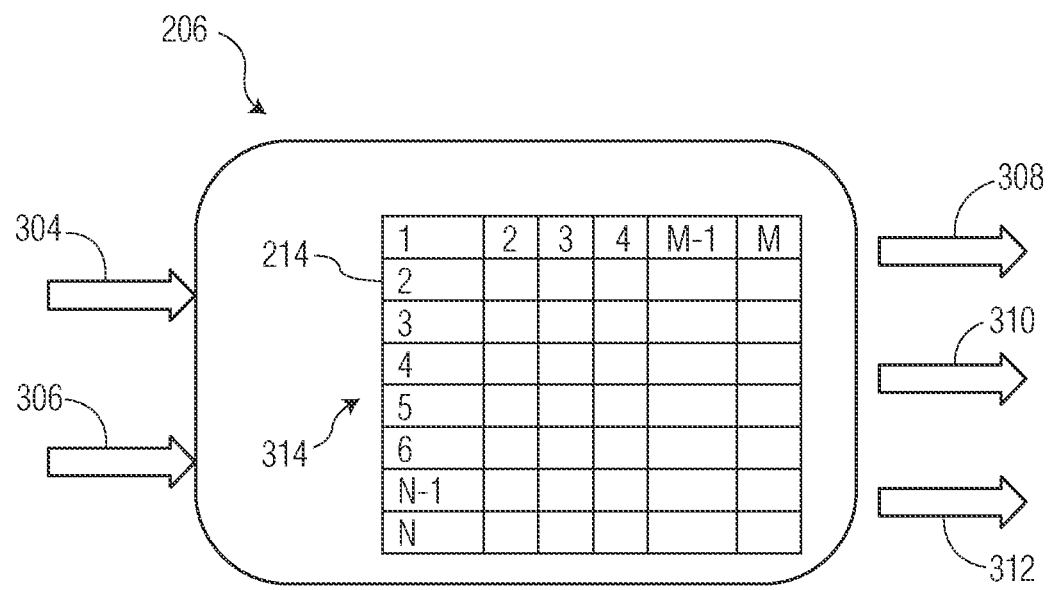
FIG. 3A is block diagram of one embodiment of a beamformer control unit of the present technology, having a first configuration, which may be used in the antenna device of FIG. 2.
Figure 3B:
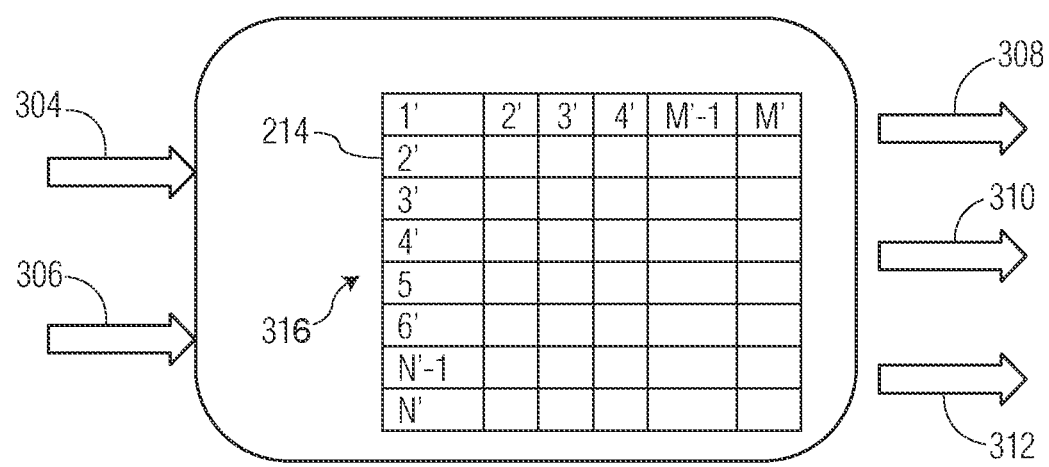
FIG. 3B is block diagram of one embodiment of the beamformer control unit of FIG. 3A, having a second configuration.

As shown in FIGS. 2 and 3A-3B, the beamformer control unit 206 includes a modifiable lookup table 214 that the beamformer control unit uses to control beam characteristics of the electromagnetic sensing beams sent by the at least one antenna device 200. The beam characteristics may include at least beam width, beam strength, and beam direction. The lookup table 214 may be configured as a matrix having N rows and M columns. In other examples, the lookup table 214 can take the form of a three-dimensional (3D) or four-dimensional (4D) lookup table including subsets." In at least one example, the beamformer control unit 206 may receive various control signals from the base station control unit 208, including for example, lookup table selection signals 304 during normal operation, as well as updates such as modified lookup table data 306. In response to lookup table selection signals 304 during normal operation, the beamformer control unit 206 may use the lookup table 214 to generate settings to control the beam characteristics, such as gain settings 308 to control beam strength, element selection settings 310 to control beam width, and phase settings 312 to control beam direction.

Referring back to FIG. 2, the antenna device 200 sends a first set of electromagnetic sensing beams 216 having a first set of beam characteristics to an environmental area 218 within a field of view of the at least one antenna device 200 to detect environmental objects, such as first environmental object 220 and second environmental object 222, within the environmental area 218. The antenna device 200 receives reflected sensing signals 224 from at least a subset of the environmental objects. The antenna device 200 sends reflected signal data 226 to the base station control unit 208. The reflected signal data 226 may include information about the sensed environmental objects, such as location and size.

The base station control unit 208 receives the reflected signal data 226 from the antenna device 200, and processes the reflected signal data to generate first processed reflected signal data. The base station control unit 208 in turn generates modified lookup table data 228 based at least in part on the first processed reflected signal data. The base station control unit 208 sends the modified lookup table data 228 to the beamformer control unit 206 to modify the lookup table 214. That is, upon receiving the modified lookup table data 228, the beamformer control unit 206 may generate a modified version of the lookup table 214. The beamformer control unit 206 may then generate and send a second set of electromagnetic sensing beams 216 having a second set of beam characteristics, where the second set of beam characteristics is determined by the beamformer control unit 206 using the modified version of the lookup table 214.

Accordingly, as shown in FIGS. 3A and 3B in at least some examples, the modifiable lookup table 214 has a first configuration 314 at a first point in time, and a second configuration 316 at a second point in time, the second configuration being based on the modified lookup table data. The lookup table 214 having the second configuration 316 may be considered a modified version of the lookup table 214 having the first configuration 314. Based upon the differences between the information included in the lookup table 214 when the lookup table has the second configuration 316 and when the lookup table has the first configuration 314, the beamformer control unit 206 may cause changes to occur in the electromagnetic signal beams transmitted by the beamformers 202. More particularly, based upon the information included in the lookup table 214 at any given time (e.g., based upon an initial set of beam characteristic data or a modified set of beam characteristic data), the beamformer control unit 206 may send amplifier control signal(s) 232 that set or adjust the settings of the respective adjustable amplifiers 212 of each of the beamformers 202 (so as to set or adjust the beam strength(s)), and also may send phase shifter control signals 234 that set or adjust the settings of the respective adjustable phase shifters 210 of each of the beamformers 202 (so as to set or adjust beam width(s) and beam direction(s)).

Referring to FIGS. 2 and 3A-3B, as one example, the beamformer control unit 206 may use the first configuration 314 of the lookup table 214 to send a first set of the electromagnetic sensing beams 216 in a first set of directions, and the beamformer control unit 206 may use the second configuration 316 of the lookup table 214 to send a second set of the electromagnetic sensing beams 216 in a second set of directions. In some such examples, the second set of directions may be a subset of the first set of directions. As another example, the beamformer control unit 206 may use the first configuration 314 of the lookup table 214 to send a first set of the electromagnetic sensing beams 216 having a first set of beam widths, and the beamformer control unit 206 may use the second configuration 316 of the lookup table 214 to send a second set of the electromagnetic sensing beams 216 having a second set of beam widths. In some such examples, the width of at least one beam in one direction in the second set may differ from the width of a beam in the one direction of the first set.

As a further example, the beamformer control unit 206 may use the first configuration 314 of the lookup table 214 to send a first set of the electromagnetic sensing beams 216 having a first set of beam strengths, and the beamformer control unit 206 may use the second configuration 316 of the lookup table 214 to send a second set of the electromagnetic sensing beams having a second set of beam strengths. In some such examples, the strength of at least one beam in one direction in the second set may differ from the strength of a beam in the one direction of the first set. Indeed, in at least some examples, the first set of beam characteristics in the first configuration 314 of the lookup table 214 may include a first set of each of beam directions, beam widths, and beam strengths, and the second set of beam characteristics in the second configuration 316 of the lookup table 214 may include a second set of each of beam directions, beam widths, and beam strengths. Any beam characteristic in the second set of beam characteristics may be the same as or different from a corresponding beam characteristic in the first set of beam characteristics. Accordingly, the second set of beam characteristics may have any combination of beam directions, beam widths, and beam strengths, as compared to the first set of beam characteristics.

Figure 4:
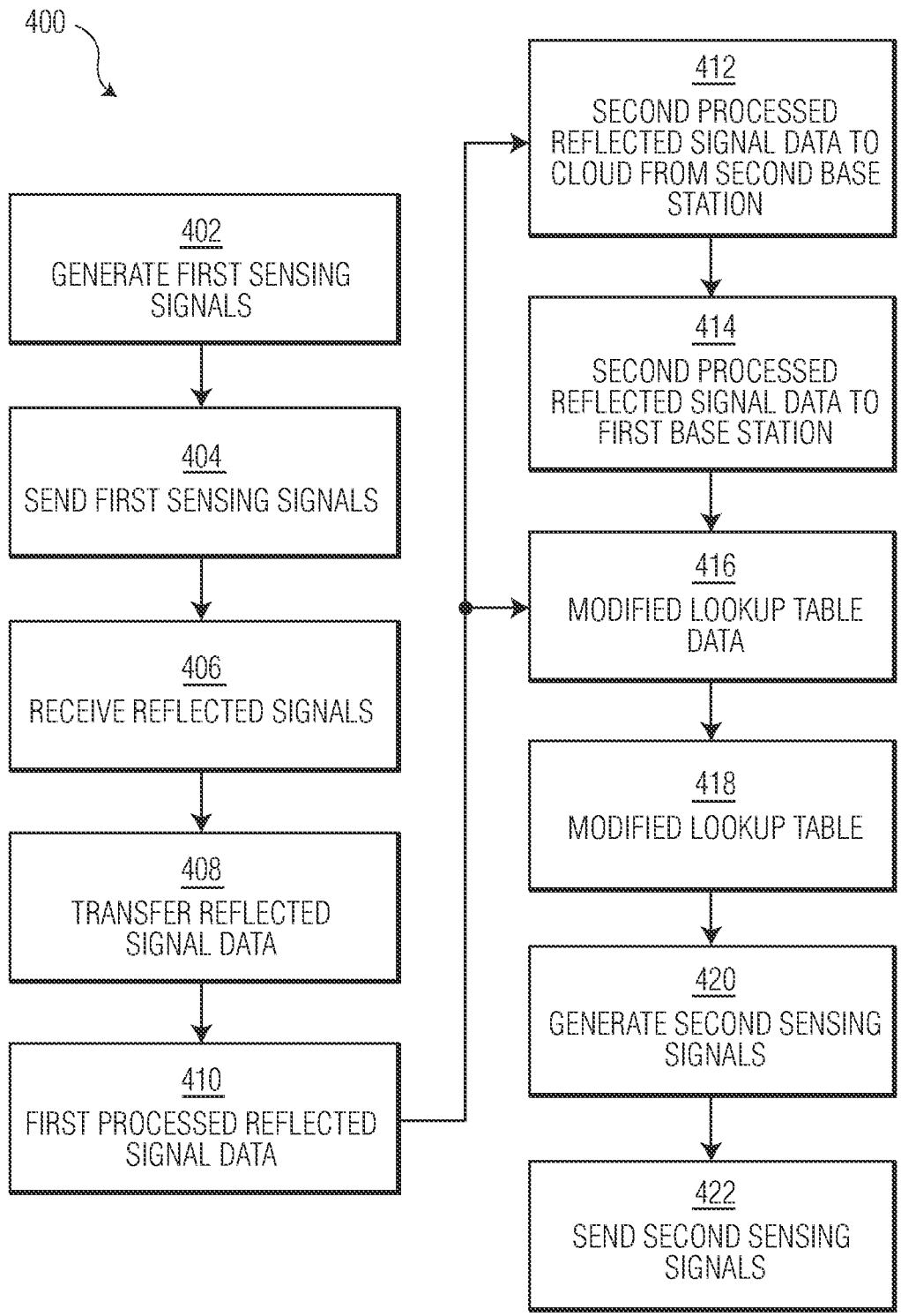
FIG. 4 is a flow diagram of one embodiment of a method of operating the system of FIG. 1.

FIG. 4 is a flow diagram of one embodiment of a method 400 of operating a system for performing both wireless communications and wireless sensing in combination, which may be the system of FIG. 1. The method 400 starts at a step 402 with an antenna device, such as any of the antenna devices 104 and 200 of FIGS. 1 and 2, causing a beamformer such as the beamformer 202 to generate a first set of electromagnetic sensing beams having a first set of beam characteristics. The first set of beam characteristics is determined by the beamformer control unit using a first configuration of a modifiable lookup table. Referring to FIG. 2, one example would be beamformer control unit 206 using modifiable lookup table 214 in its initial configuration. Referring back to FIG. 4, the method continues to a step 404, which includes sending the first set of electromagnetic sensing beams from the at least one antenna device to a first environmental area within a field of view of the at least one antenna device to detect environmental objects within the environmental area. One example, referring to FIG. 2, would be antenna device 200 sending a first set of electromagnetic sensing beams 216 to a first environmental area 218 to detect environmental objects 220 and 222 within the environmental area 218.

Referring back to FIG. 4, the method continues to a step 406, which includes receiving the reflected sensing signals by the at least one antenna device from the environmental objects, or at least from a subset of the environmental objects. One example, referring to FIG. 2, would be the antenna device 200 receiving reflected sensing signals 224 from the environmental objects 220 and 222. Referring back to FIG. 4, the method continues to a step 408, which includes transferring reflected signal data from the at least one antenna device to the base station control unit. Referring to FIG. 2, one example would be the antenna device 200 transferring reflected signal data 226 to the base station control unit 208. Referring back to FIG. 4, the method continues to a step 410, which includes generating first processed reflected signal data by processing the reflected signal data by the base station control unit. One example, referring to FIG. 2, would be the base station control unit 208 generating first processed reflected signal data by processing the reflected signal data 226.

Referring back to FIG. 4, in examples where there is only one base station, the method may continue to a step 416, which includes generating modified lookup table data based at least in part on the first processed reflected signal data by the base station control unit. One example, referring to FIG. 2, would be the base station control unit 208 generating modified lookup table data 228 based at least in part on the reflected signal data 226 (as processed by the base station control unit). Referring back to FIG. 4, the method may then continue to a step 418, which includes generating a modified version of the lookup table by the beamformer control unit based on the modified lookup table data. Referring to FIG. 2, one example would be the beamformer control unit 206 generating a modified version of the lookup table 214 (e.g., the second configuration 316 of the lookup table in place of the first configuration 314 of the lookup table) based on the modified lookup table data 228.

Referring back to FIG. 4, the method may then continue to a step 420, which includes generating by the beamformer a second set of electromagnetic sensing beams having a second set of beam characteristics, the second set of beam characteristics being determined by the beamformer control unit using the modified version of the lookup table. One example, referring to FIG. 2, would be the beamformer 202 generating a second set of electromagnetic sensing beams 216, which have a second set of beam characteristics that have been determined by the beamformer control unit 206 based on the modified version of the lookup table 214. Referring back to FIG. 4, the method may then continue to a step 422, which includes sending the second set of electromagnetic sensing beams from the at least one antenna device to a second environmental area within the field of view of the at least one antenna device. The second environmental area may be the same as the first environmental area, or may be different, such as being a subregion (or subportion or subset) of the first environmental area. Referring to FIG. 2, one example would be the antenna device 200 sending the second set of the electromagnetic sensing beams 216 to environmental area 218.

In at least some examples, generating by the beamformer the first set of electromagnetic sensing beams having the first set of beam characteristics at step 402 of method 400 may include defining a first set of beam directions as part of the first set of beam characteristics. Additionally, generating by the beamformer the second set of electromagnetic sensing beams having the second set of beam characteristics at step 420 may include defining a second set of beam directions as part of the second set of beam characteristics. The second set of beam directions may be a subset of the first set of beam directions. In other words, the system may modify the directions in which sensing beams are sent so that beams are only sent in directions that cover a portion of the field of view of the antenna device. For example, as discussed more fully with respect to FIG. 5 below, when the system determines that there is an environmental object (e.g., a building) that blocks part of the field of view based on the processing of initial reflected signal data, then the second set of beam directions may only direct means to the portion of the field of view that is not blocked.

Additionally, in at least some examples, generating by the beamformer the first set of electromagnetic sensing beams having the first set of beam characteristics at step 402 of method 400 may include defining a first set of beam widths as part of the first set of beam characteristics. Additionally, generating by the beamformer the second set of electromagnetic sensing beams having the second set of beam characteristics at step 420 may include defining a second set of beam widths as part of the second set of beam characteristics. The width of at least one beam in one direction in the second set of beam widths may differ from the width of at least one beam in the one direction of the first set of beam widths. For example, as discussed more fully with respect to FIGS. 7A-7E below, when a group of environmental objects are identified, based on the processing of initial reflected signal data, more and narrower beams may be subsequently sent towards that group, to provide more detailed sensing of the group.

Further, in at least some examples, generating by the beamformer the first set of electromagnetic sensing beams having the first set of beam characteristics at step 402 of method 400 may include defining a first set of beam strengths as part of the first set of beam characteristics. Additionally, generating by the beamformer the second set of electromagnetic sensing beams having the second set of beam characteristics at step 420 may include defining a second set of beam strengths as part of the second set of beam characteristics. The strength of at least one beam in one direction in the second set of beam strengths may differ from the strength of at least one beam in the one direction of the first set of beam strengths. For example, as discussed more fully with respect to FIGS. 8A-8B below, when an environmental object, such as a building is determined, based on the processing of initial reflected signal data, to be present at a distance, such that it blocks a portion of the range of the electromagnetic sensing beams, the strength of beams being sent in the direction of the building may be subsequently reduced to a point where reflections are no longer received from that environmental object.

Figure 6:
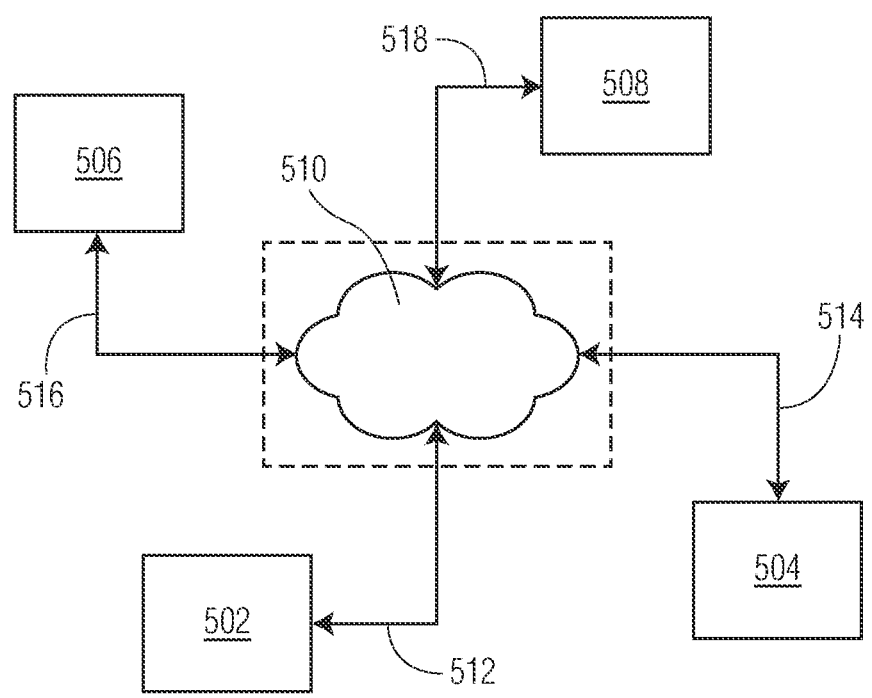
FIG. 6 is a block diagram of the base stations and cloud backend of the system of FIG. 5.

Referring back to FIG. 4, in examples where the system includes multiple base stations, the method may continue from step 410 to step 412, instead of skipping to step 416. Step 412 includes sending second processed reflected signal data to a cloud backend from a second base station. For example, with reference to FIG. 6, discussed more fully below, base station 502 may be the first base station, and base station 504 may be the second base station. Second base station 504 may send second processed reflected signal data to the cloud backend 510. Referring back to FIG. 4, the method may continue from step 412 to step 414, which includes sending the second processed reflected signal data from the cloud backend to the first base station. In the example of FIG. 6, such a step may include the cloud backend 510 sending the second processed reflected signal data it received from the second base station 504 to the first base station 502. Referring back to FIG. 4, the method may continue from step 414 to step 416, where generating modified lookup table data by the base station control unit of the first base station may be based at least in part on the first processed reflected signal data and the second processed reflected signal data. The method 400 may then continue to steps 418-422 as described above.

Figure 5:
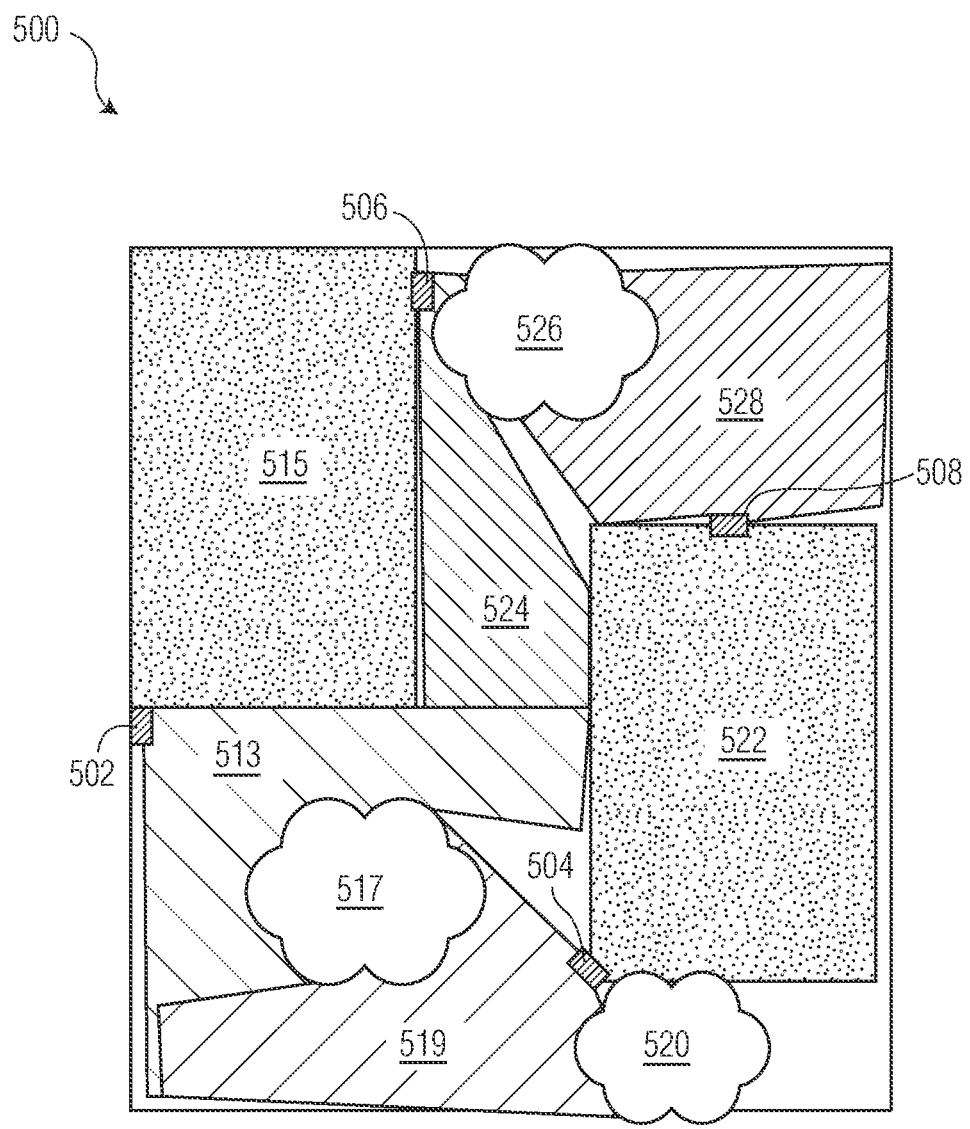
FIG. 5 is a block diagram of a second embodiment of a system of the present technology for performing wireless sensing in combination with wireless communication, in an environmental area with environmental objects, with field of view scanning optimization.

FIGS. 5 and 6 illustrate one example of a system 500 of the present technology that includes a plurality of base stations. Such systems include a first base station and at least a second base station, as well as a cloud backend, with the first base station and the second base station each being in communication with the cloud backend. As shown in FIGS. 5 and 6, the system 500 in the present example embodiment includes a first base station 502, a second base station 504, a third base station 506, and a fourth base station 508. Although four base stations are illustrated in FIGS. 5 and 6, it should be understood that any number of base stations may be included in a system of the present technology. Each of the base stations 502, 504, 506, and 508 of the system 500 may have the same components as the base station 102 as described with respect to FIG. 1. Additionally, as shown in FIG. 6, each of the base stations 502, 504, 506, and 508 of the system 500 is coupled at least indirectly to a cloud backend 510, and thus (by way of the cloud backend) is also coupled at least indirectly with each other base station of the system 500.

In some examples of systems that include a plurality of base stations, each of the base stations sends its processed reflected signal data to the cloud backend. As shown in FIG. 6, the first base station 502 sends first processed reflected signal data 512 to the cloud backend 510, the second base station 504 sends second processed reflected signal data 514 to the cloud backend 510, the third base station 506 sends third processed reflected signal data 516 to the cloud backend 510, and the fourth base station 508 sends fourth processed reflected signal data 518 to the cloud backend 510. The cloud backend then sends the processed reflected signal data from each base station to any or all of the other base stations to be used in generating modified lookup table data for each respective base station. For example, with respect to the first base station 502 and the second base station 504, the second base station 504 may send second processed reflected signal data 514 to the cloud backend 510, and the cloud backend 510 may send the second processed reflected signal data 514 to the first base station. The first base station 502 generates and sends modified lookup table data to the beamformer of the first base station, such as the beamformer 202 of FIG. 2, based at least in part on the first processed reflected signal data 512 and the second processed reflected signal data 514.

For purposes of the embodiment illustrated in FIGS. 5 and 6, each of the base stations of system 500 has a field of view that covers, or is capable of covering, at least 180° when there are no obstructions. The entire field of view for each base station in system 500 is thus at least 180°. However, as shown in FIG. 5, at least a portion of the field of view of each of the base stations is blocked by at least one environmental object. The field of view of the first base station 502 is partially blocked by at least a first building 515 and a first tree 517. The field of view of the second base station 504 is partially blocked by at least the first tree 517 and a second tree 520. The field of view of the third base station 506 is partially blocked by at least the first building 515, a second building 522, and a third tree 526. The field of view of the fourth base station 508 is partially blocked by at least the third tree 526.

Upon installation, the system 500 may perform an initial field of view optimization to avoid sending subsequent sensing signals to environmental areas that are obstructed. The initial field of view optimization may also be used to avoid sending subsequent sensing signals that would unnecessarily overlap with sensing areas covered by other base stations. An initial field of view optimization may include installing each base station and performing at least a first sensing operation. Each base station, as installed, may have a modifiable lookup table, such as modifiable lookup table having an initial configuration, such as the modifiable lookup table 214 having the first (initial) configuration 314 as shown in FIG. 3A. In each base station, the initial configuration may be used by the beamformer control unit to cause the antenna device to generate a first set of electromagnetic sensing beams and to send those electromagnetic sensing beams toward (and into) the environmental area within the entire field of view of the antenna device, to detect environmental objects within the environmental area. Alternatively, if there is pre-determined information regarding environmental objects that is known prior to installing any of the base stations, the initial configuration of the lookup table may be created taking that information into account, such that the first set of electromagnetic sensing beams may be sent to an environmental area within a portion of the entire field of view of the antenna device.

With respect to each of the base stations 502, 504, 506, and 508, reflected signals received by the respective antenna device associated with the respective base station may be sent to the base station control unit and used to generate processed reflected signal data, which may be indicative of environmental objects that obstruct at least a portion of the field of view of the antenna device. It should be understood that multiple sensing operations may be used to determine whether a sensed environmental object is stationary or mobile, and whether the sensed environmental object is a temporary or permanent obstruction to the field of view. Each base station control unit may send its processed reflected signal data to the cloud backend 510, and receive from the cloud backend processed reflected signal data from one or more of the other base stations. Each base station control unit may then generate modified lookup table data based at least in part on its own processed reflected signal data as well as any or all processed reflected signal data received from the cloud backend. Each base station control unit sends its modified lookup table data to its beamformer control unit, which generates a modified version of the lookup table (for example, the lookup table having the second configuration 316) that the beamformer control unit may then use to generate at least a second set of electromagnetic sensing beams.

FIG. 5 illustrates the environmental area to which the second set of electromagnetic sensing beams for each base station is sent, representing the result of the initial field of view optimization. Each of the beam width, beam direction and beam strength, or any combination thereof, of each electromagnetic sensing beam in the second set of electromagnetic sensing beams for each base station may be modified as compared to a corresponding electromagnetic sensing beam of the first set of electromagnetic sensing beams. As shown, the environmental area to which the first base station 502 sends electromagnetic sensing beams using its modified lookup table is first area 513, which has been limited based on at least the detection of the first building 515, the second building 522, and the first tree 517, as well as the environmental area to be scanned by the second base station 504. The environmental area to which the second base station 504 sends electromagnetic sensing beams using its modified lookup table is second area 519, which has been limited based on at least the detection of the first tree 517, and the second tree 520, as well and the environmental area to be scanned by the first base station 502. The environmental area to which the third base station 506 sends electromagnetic sensing beams using its modified lookup table is third area 524, which has been limited based on at least the detection of the first building 515, the second building 522, and the third tree 526, as well and the environmental area to be scanned by the first base station 502. The environmental area to which the fourth base station 508 sends electromagnetic sensing beams using its modified lookup table is fourth area 528, which has been limited based on at least the detection of the third tree 526 and the environmental area to be scanned by the third base station 506.

FIGS. 7A-7E illustrate one example of a system 600 of the present technology that includes a first base station 602. The base station 102 as described with respect to FIG. 1 may be used as the base station 602. Although only the first base station 602 is shown, in other embodiments more than one of the base stations may be present and operating. FIGS. 7A-7E illustrate the operation of the system 600 at five points in time, using a coarse to fine beam width scanning algorithm.

Figure 7A:
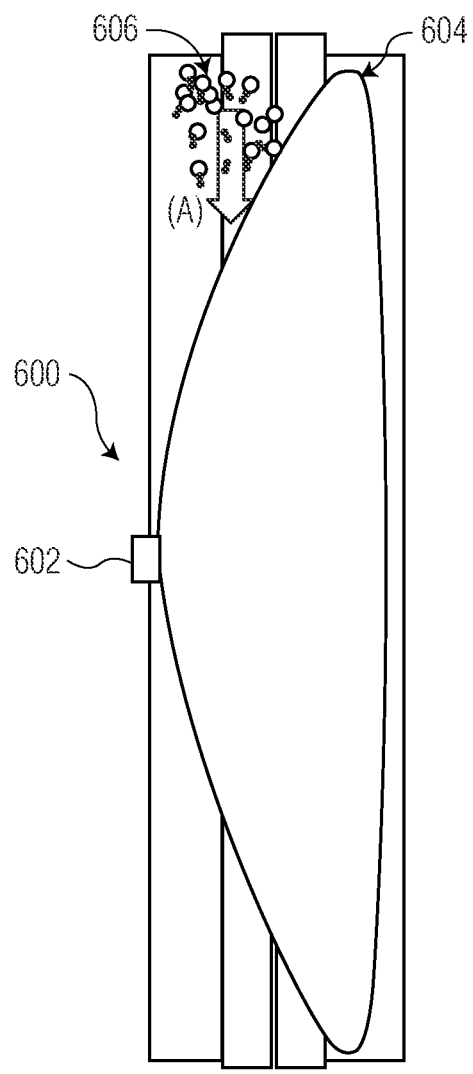
FIG. 7A is a block diagram of the system of FIG. 1 in an environmental area, operating at a first point in time using a coarse to fine sensing algorithm.

FIG. 7A illustrates a first set of electromagnetic sensing beams sent by the base station 602 at a first point in time, where the beamformer control unit of the base station is using an initial lookup table. The first set of electromagnetic sensing beams includes a single electromagnetic sensing beam 604 having an initial beam width that is as wide as the base station 602 is capable of generating. This may be considered to be a very rough scan of the environmental area within the field of view of the base station 602. As illustrated, the single electromagnetic sensing beam 604 does not detect a group of targets 606.

Figure 7B:
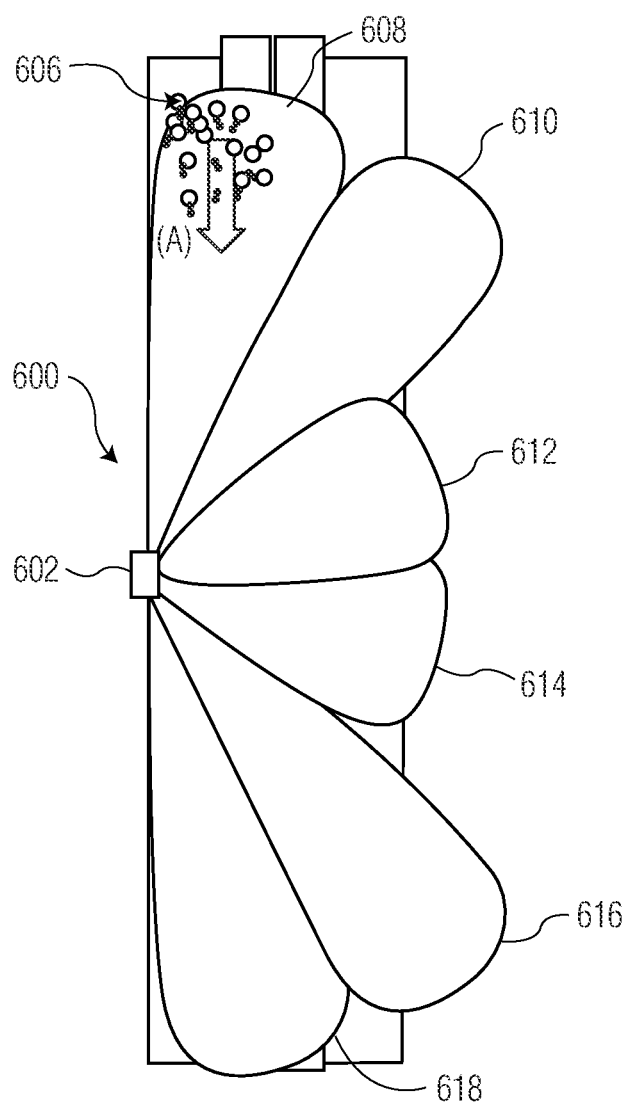
FIG. 7B is a block diagram of the system of FIG. 7A operating at a second point in time.

FIG. 7B illustrates a second set of electromagnetic sensing beams sent by the base station 602 at a second point in time, which includes multiple electromagnetic sensing beams, each of which still has a relatively wide beam width, although each beam width is narrower than the initial beam width of the electromagnetic sensing beam 604. In this example, the beamformer control unit is using a first modified lookup table, based on the lack of detection of any environmental objects in during the first scan. As shown, the second set of electromagnetic sensing beams includes a first electromagnetic sensing beam 608, a second electromagnetic sensing beam 610, a third electromagnetic sensing beam 612, a fourth electromagnetic sensing beam 614, a fifth electromagnetic sensing beam 616, and a sixth electromagnetic sensing beam 618. The second set of electromagnetic sensing beams is able to cover the entire field of view of the base station 602, and the first electromagnetic sensing beam 608 detects the group of targets 606.

Figure 7C:
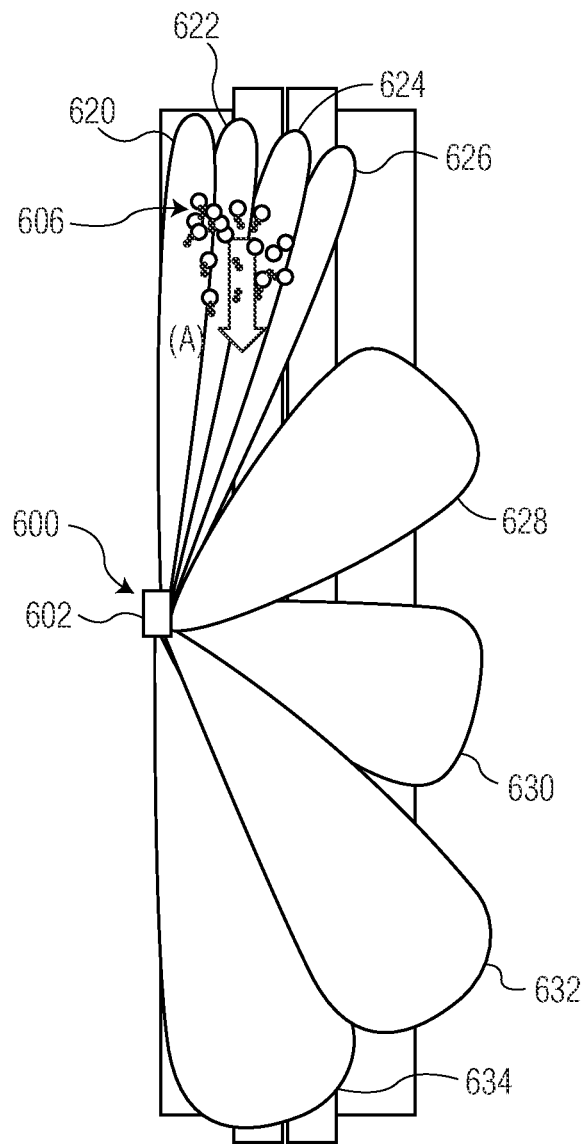
FIG. 7C is a block diagram of the system of FIG. 7A operating at a third point in time.

FIG. 7C illustrates a third set of electromagnetic sensing beams sent by the base station 602 at a third point in time, which includes multiple narrow electromagnetic sensing beams directed towards the first group of targets 606, as well as multiple wider electromagnetic sensing beams directed towards the remaining environmental area where no targets were previously detected. In this example, the beamformer control unit is using a second modified version of the lookup table (e.g., a third configuration of the lookup table differing from the first and second configuration 314 and 316), based on the detection of the first group of targets 606 during the second scan. As shown, the third set of electromagnetic sensing beams includes a first electromagnetic sensing beam 620, a second electromagnetic sensing beam 622, a third electromagnetic sensing beam 624, and a fourth electromagnetic sensing beam 626, each of which has a narrow beam width and is directed towards the environmental area including and immediately surrounding the first group of targets 606. The use of a greater number of beams that are each narrow may allow the base station 602 to obtain more detailed information about the targets of the group, including the number of individual targets within the group, and a travel vector, such as vector A, of the first group of targets 606. The third set of electromagnetic sensing beams also includes a fifth electromagnetic sensing beam 628, a sixth electromagnetic sensing beam 630, a seventh electromagnetic sensing beam 632, and an eighth electromagnetic sensing beam 634, each of which has a relatively wide beam width (e.g., by comparison with any of the beams 620, 622, 624, and 626).

In at least some examples of the system 600, the first group of targets 606 may include one or more communication devices that establish one or more communication links with the base station 602 for purposes of wireless communication, such as cellular communications. In such examples, the base station control unit may generate a modified lookup table based at least in part on information regarding any such communication link. Accordingly, the scanning shown in FIGS. 7A and 7B may not be conducted, since the system 600 may have information regarding the presence of the first group of targets 606 provided by way of the one or more communication links. Assuming that a large portion of end users tend to carry active user equipment that establishes a communication link with the nearest base station, using the information regarding existing communication links may enables quick identification of crowds and their characteristics (e.g., location, movement). However, relying solely on active communication links to generate a set of electromagnetic sensing beams is not recommended, because it would leave the system blind in directions of in which there are no active communication links.

Figure 7D:
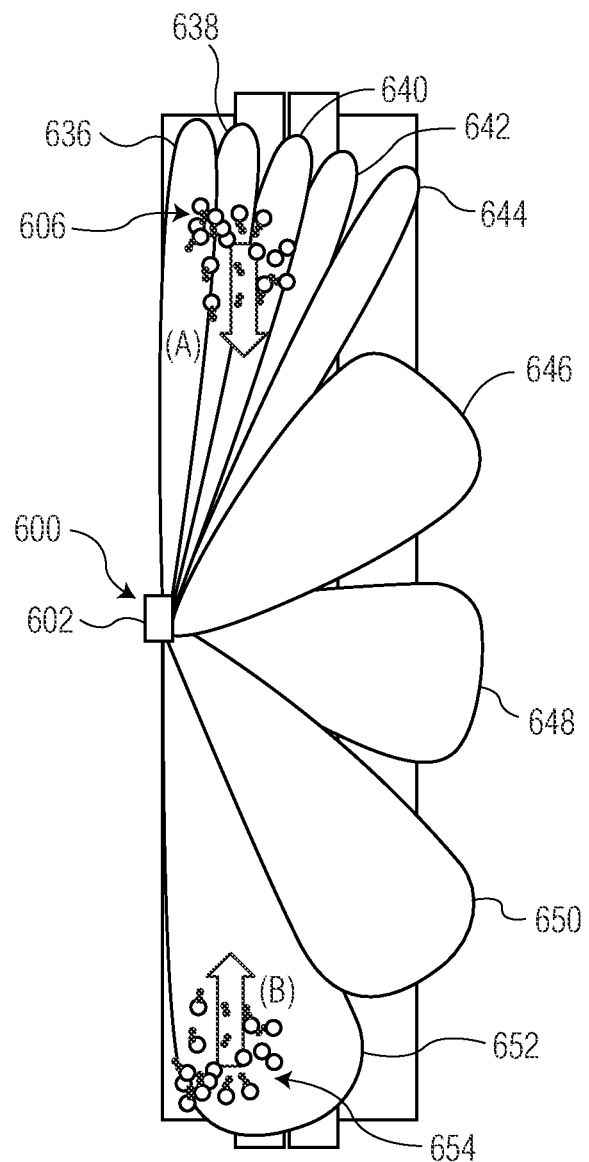
FIG. 7D is a block diagram of the system of FIG. 7A operating at a fourth point in time.

For example, FIG. 7D illustrates a fourth set of electromagnetic sensing beams sent by the base station 602 at a fourth point in time, which includes multiple narrow electromagnetic sensing beams directed both towards the first group of targets 606 and the direction in which first group of targets 606 is traveling, as well as multiple wider electromagnetic sensing beams directed toward the remaining environmental area where no targets were previously detected. In this example, the beamformer control unit uses a lookup table that is generated based at least in part on information gathered by the base station 602 from active communication links established between the base station 602 and active equipment of any members of the first group of targets 606

As shown, the fourth set of electromagnetic sensing beams includes a first electromagnetic sensing beam 636, a second electromagnetic sensing beam 638, a third electromagnetic sensing beam 640, a fourth electromagnetic sensing beam 642, and a fifth electromagnetic sensing beam 644, each of which has a narrow beam width and is directed toward the environmental area including the first group of targets 606 and the environmental area into which first group of targets 606 is predicted to move based on the determined travel vector A. The fourth set of electromagnetic sensing beams also includes a sixth electromagnetic sensing beam 646, a seventh electromagnetic sensing beam 648, an eighth electromagnetic sensing beam 650, and a ninth electromagnetic sensing beam 652, each of which has a relatively wide beam width. In this example, the ninth electromagnetic sensing beam 652 detects a second group of targets 654. The system 600 may track the second group of targets 654 in a manner similar to the tracking of the first group of targets 606, and proceed by tracking both target groups simultaneously.

Figure 7E:
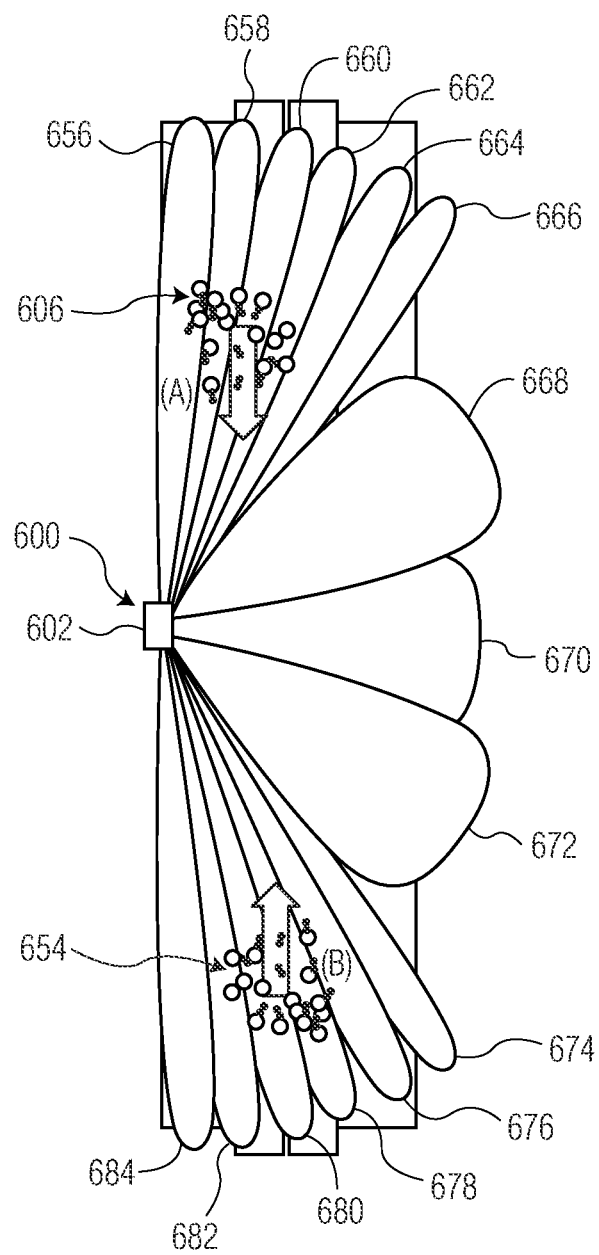
FIG. 7E is a block diagram of the system of FIG. 7A operating at a fifth point in time.

FIG. 7E illustrates a fifth set of electromagnetic sensing beams sent by the base station 602 at a fifth point in time, which includes: (1) multiple narrow electromagnetic sensing beams directed both towards the first group of targets 606 and the direction in which first group of targets 606 is traveling; (2) multiple narrow electromagnetic sensing beams directed both towards the second group of targets 654 and the direction in which second group of targets 654 is traveling; and (3) multiple wider electromagnetic sensing beams directed towards the remaining environmental area where no targets were previously detected. In this example, the beamformer control unit is using a modified version of the lookup table, which may be based at least in part on the detection of the first group of targets 606 and the travel vector A of the first group of targets 606, as well as the detection of the second group of targets 654 and the travel vector B of the second group of targets 654, as determined by earlier scans and/or any active communication links established between the base station 602 and active equipment of any members of the first group of targets 606 and/or the second group of targets 654.

As shown, the fifth set of electromagnetic sensing beams includes a first electromagnetic sensing beam 656, a second electromagnetic sensing beam 658, a third electromagnetic sensing beam 660, a fourth electromagnetic sensing beam 662, a fifth electromagnetic sensing beam 664, and a sixth electromagnetic sensing beam 666, each of which has a narrow beam width and is directed towards the environmental area including the first group of targets 606 and the environmental area into which first group of targets 606 is predicted to move based on the determined travel vector A. The fifth set of electromagnetic sensing beams also includes a seventh electromagnetic sensing beam 668, an eighth electromagnetic sensing beam 670, and a ninth electromagnetic sensing beam 672, each of which has a relatively wide beam width directed into portions of the environmental area where no targets have been previously detected. The fifth set of electromagnetic sensing beams further includes a tenth electromagnetic sensing beam 674, an eleventh electromagnetic sensing beam 676, a twelfth electromagnetic sensing beam 678, a thirteenth electromagnetic sensing beam 680, a fourteenth electromagnetic sensing beam 682, and a fifteenth electromagnetic sensing beam 684, each of which has a narrow beam width and is directed towards the environmental area including the second group of targets 654 and the environmental area into which second group of targets 654 is predicted to move based on the determined travel vector B.

Figure 8A:
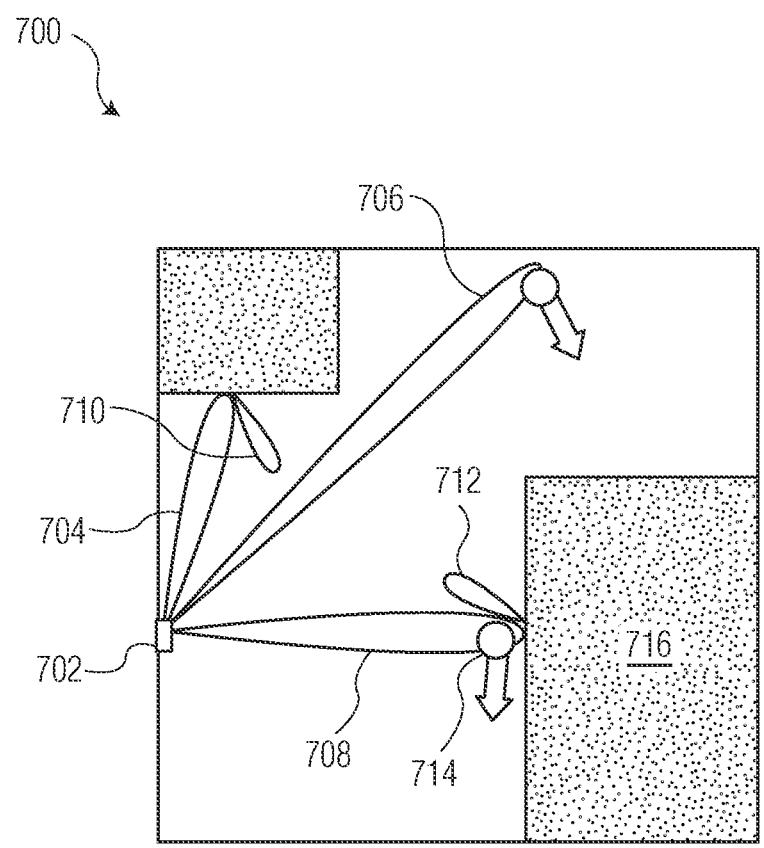
FIG. 8A is block diagram of a system of FIG. 1, in an environmental area having environmental objects, operating at a first point in time using a power scaling algorithm.
Figure 8B:
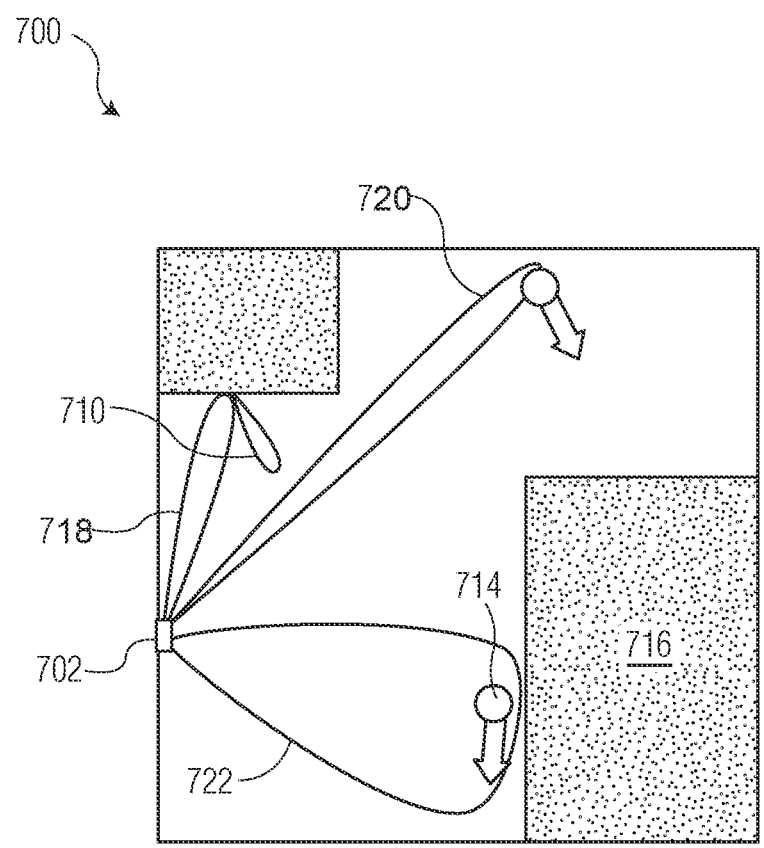
FIG. 8B is a block diagram of the system of FIG. 8A operating at a second point in time.

FIGS. 8A and 8B illustrate one example of a system 700 of the present technology that includes a first base station 702. The base station 102 as described with respect to FIG. 1 may be used as the base station 702 and, in other embodiments, the system may include more than one of the base stations. FIG. 8A illustrates a first set of electromagnetic sensing beams sent by the antenna device of the base station 702 at a first point in time, including a first electromagnetic sensing beam 704, a second electromagnetic sensing beam 706, and a third electromagnetic sensing beam 708. Reflected signal data, such as first reflected signal data 710 and second reflected signal data 712, may be received by the base station 702 and used to generate a modified version of the lookup table that adjusts the beam characteristics, such as beam direction, beam strength and/or beam width, of at least one electromagnetic sensing beam. For example, the strength of the third electromagnetic sensing beam 708 is sufficient to reach a target 714 and a building 716. Although it may be desirable to continue to send subsequent electromagnetic sensing beams to reach the target 714, it is not necessary for those subsequent electromagnetic sensing beams to also reach the building 716. Accordingly, base station 702 may utilize power scaling by modifying its lookup table to reduce at least the strength of the third electromagnetic sensing beam in a second set of electromagnetic sensing beams, and potentially additional subsequent sets thereafter.

FIG. 8B illustrates the second set of electromagnetic sensing beams sent by the antenna device of the base station 602 at a second point in time. As shown, a first electromagnetic sensing beam 718 and a second electromagnetic sensing beam 720 of the second set of electromagnetic sensing beams are identical to, or at least substantially the same as, the first electromagnetic sensing beam 704 and the second electromagnetic sensing beam 706, respectively (as shown in FIG. 8A), with respect to beam direction, beam strength, and beam width. The third electromagnetic sensing beam 722 of the second set of electromagnetic sensing beams, in contrast, has been modified to have both reduced beam strength and increased beam width as compared to the third electromagnetic sensing beam 708 of the first set of electromagnetic sensing beams. In this example, there may be optimization of the system operation in the second set of electromagnetic sensing beams as compared to the first set of electromagnetic sensing beams, due to the reduced power output and increased area covered by the third electromagnetic sensing beam 722.

Notwithstanding the above description, the present disclosure is intended to encompass numerous embodiments including those disclosed herein as well as a variety of alternate embodiments. In various examples of such an alternate embodiments any number of base stations may be coupled at least indirectly to the cloud backend, and processed sensed signal data from any or all of the other base stations in the system may be used by any base station in the system to modify its lookup table. In at least some embodiments, the lookup table may be modified continuously, based on reflected signal data from each set of electromagnetic sensing beams, or may be updated only periodically, such an once per minute, once per every five minutes, once per hour, or once per any other desired time period. In other embodiments, the lookup table may be modified in response to the occurrence of certain pre-defined criteria, such as the sensing of one or more moving targets.

Further, in at least some examples encompassed herein, the present disclosure relates to a system for performing both wireless communications and wireless sensing in combination. The system includes at least a first base station. The first base station includes at least one antenna device and at least one base station control unit coupled at least indirectly to the at least one antenna device. The at least one antenna device sends electromagnetic sensing beams to an environmental area within a field of view of the at least one antenna device to detect environmental objects within the environmental area. The at least one antenna device also receives reflected sensing signals from at least a subset of the environmental objects, and sends reflected signal data to the base station control unit. The at least one antenna device includes a beamformer that includes an adjustable phase shifter and an adjustable amplifier. The at least one antenna device also includes an antenna coupled at least indirectly to the beamformer. The at least one antenna device further includes a beamformer control unit coupled at least indirectly to the base station control unit and each of the adjustable phase shifter and the adjustable amplifier. The beamformer control unit includes a modifiable lookup table that the beamformer control unit uses to control beam characteristics of the electromagnetic sensing beams sent by the at least one antenna device. The base station control unit receives the reflected signal data, processes the reflected signal data and generates first processed reflected signal data, and sends modified lookup table data based at least in part on the first processed reflected signal data to the beamformer control unit to modify the lookup table.

In at least some examples of systems, the beam characteristics include beam width, beam strength, and beam direction. Additionally, the adjustable phase shifter may be adjustable by the beamformer control unit to any of a plurality of phase settings, the plurality of phase settings including a plurality of beam directions. Further, the adjustable amplifier may be adjustable by the beamformer control unit to any of a plurality of amplifier settings, the amplifier settings including on, off, and a plurality of power settings that each correspond to a beam strength.

In at least some examples, the modifiable lookup table has a first configuration at a first point in time, and a second configuration at a second point in time, the second configuration being based on the modified lookup table data. In such examples, the beamformer control unit may use the first configuration of the lookup table to send a first set of the electromagnetic sensing beams in a first set of directions, and may use the second configuration of the lookup table to send a second set of the electromagnetic sensing beams in a second set of directions, wherein the second set of directions is a subset of the first set of directions. In at least one such example, the beamformer control unit may use the first configuration of the lookup table to send a first set of the electromagnetic sensing beams having a first set of beam widths, and the beamformer control unit may use the second configuration of the lookup table to send a second set of the electromagnetic sensing beams having a second set of beam widths, wherein the width of at least one beam in one direction in the second set differs from the width of a beam in the one direction of the first set. In at least a second such example, the beamformer control unit may use the first configuration of the lookup table to send a first set of the electromagnetic sensing beams having a first set of beam strengths, and the beamformer control unit may use the second configuration of the lookup table to send a second set of the electromagnetic sensing beams having a second set of beam strengths, wherein the strength of at least one beam in one direction in the second set differs from the strength of a beam in the one direction of the first set.

In some examples, systems of the present technology include at least a second base station and a cloud backend. In such examples, the first base station and the second base station are each in communication with the cloud backend. In at least one example, the second base station sends second processed reflected signal data to the cloud backend, the cloud backend sends the second processed reflected signal data to the first base station, and the first base station sends the modified lookup table data to the beamformer based at least in part on the first processed reflected signal data and the second processed reflected signal data.

In a particular example of a system, the present disclosure relates to a system for performing both wireless communications and wireless sensing in combination. The system includes at least a first base station. The first base station includes at least one antenna device and at least one base station control unit coupled at least indirectly to the at least one antenna device. The at least one antenna device sends electromagnetic sensing beams to an environmental area within a field of view of the at least one antenna device to detect environmental objects within the environmental area. The at least one antenna device also receives reflected sensing signals from at least a subset of the environmental objects, and sends reflected signal data to the base station control unit. The at least one antenna device includes a beamformer that includes an adjustable phase shifter and an adjustable amplifier. The beamformer includes an adjustable phase shifter and an adjustable amplifier, the adjustable amplifier being adjustable by the beamformer control unit to any of a plurality of amplifier settings, the amplifier settings including on, off, and a plurality of power settings that each correspond to a beam strength. The at least one antenna device also includes an antenna coupled at least indirectly to the beamformer. The at least one antenna device further includes a beamformer control unit coupled at least indirectly to the base station control unit and each of the adjustable phase shifter and the adjustable amplifier. The beamformer control unit includes a modifiable lookup table that the beamformer control unit uses to control beam characteristics of the electromagnetic sensing beams sent by the at least one antenna device. The base station control unit receives the reflected signal data, processes the reflected signal data and generates first processed reflected signal data, and sends modified lookup table data based at least in part on the first processed reflected signal data to the beamformer control unit to modify the lookup table.

Also, in at least some examples encompassed herein, the present disclosure relates to a method of operating a base station control unit in a system for performing both wireless communications and wireless sensing in combination. The method includes receiving by the base station control unit reflected signal data from at least one antenna device of a base station, the base station control unit being coupled at least indirectly to the at least one antenna device. The at least one antenna device sends electromagnetic sensing beams to an environmental area within a field of view of the at least one antenna device to detect environmental objects within the environmental area, and receives the reflected sensing signals from at least a subset of the environmental objects. The method further includes processing by the base station control unit the reflected signal data and generating first processed reflected signal data. The method additionally includes sending, from the base station control unit to a beamformer control unit, lookup table data based at least in part on the first processed reflected signal data, where the lookup table data is used by the beamformer control unit to control beam characteristics of the electromagnetic sensing beams sent by the at least one antenna device.

In at least some examples encompassed herein, the present disclosure relates to a method of operating a system for performing both wireless communications and wireless sensing in combination. One system with which the method may be used includes at least a first base station that includes at least one antenna device and at least one base station control unit coupled at least indirectly to the at least one antenna device. The at least one antenna device includes a beamformer that includes an adjustable phase shifter and an adjustable amplifier, an antenna coupled at least indirectly to the beamformer, and a beamformer control unit coupled at least indirectly to the base station control unit and each of the adjustable phase shifter and the adjustable amplifier. The beamformer control unit including a modifiable lookup table.

One example of a method for use with such as system includes the following steps. A step of generating by the beamformer a first set of electromagnetic sensing beams having a first set of beam characteristics, the first set of beam characteristics being determined by the beamformer control unit using the modifiable lookup table. An additional step of sending the first set of electromagnetic sensing beams from the at least one antenna device to a first environmental area within a field of view of the at least one antenna device to detect environmental objects within the environmental area. A further step of receiving reflected sensing signals by the at least one antenna device from at least a subset of the environmental objects. The exemplary method also includes a step of transferring reflected signal data from the at least one antenna device to the base station control unit, and a step of generating first processed reflected signal data by processing the reflected signal data by the base station control unit. The method also include generating modified lookup table data based at least in part on the first processed reflected signal data by the base station control unit.

In some examples, the method may include further steps of: generating a modified lookup table by the beamformer control unit based on the modified lookup table data; generating by the beamformer a second set of electromagnetic sensing beams having a second set of beam characteristics, the second set of beam characteristics being determined by the beamformer control unit using the modified lookup table; and sending the second set of electromagnetic sensing beams from the at least one antenna device to a second environmental area within the field of view of the at least one antenna device.

In at least one example, generating by the beamformer the first set of electromagnetic sensing beams having the first set of beam characteristics as described above, may also include defining a first set of beam directions as part of the first set of beam characteristics. Additionally, generating by the beamformer the second set of electromagnetic sensing beams having the second set of beam characteristics as discussed above, may also include defining a second set of beam directions as part of the second set of beam characteristics. In such an example, the second set of beam directions is a subset of the first set of beam directions.

In another example generating by the beamformer the first set of electromagnetic sensing beams having the first set of beam characteristics as described above, may include defining a first set of beam widths as part of the first set of beam characteristics. Additionally, generating by the beamformer the second set of electromagnetic sensing beams having the second set of beam characteristics as described above, may also include defining a second set of beam widths as part of the second set of beam characteristics. In such an example, the width of at least one beam in one direction in the second set of beam widths differs from the width of at least one beam in the one direction of the first set of beam widths.

In yet another example, generating by the beamformer the first set of electromagnetic sensing beams having the first set of beam characteristics as described above, may include defining a first set of beam strengths as part of the first set of beam characteristics. Additionally, generating by the beamformer the second set of electromagnetic sensing beams having the second set of beam characteristics as described above, may include defining a second set of beam strengths as part of the second set of beam characteristics. In such an example, the strength of at least one beam in one direction in the second set of beam strengths differs from the strength of at least one beam in the one direction of the first set of beam strengths.

In examples where the system includes a plurality of base stations, a method of operating the system may include: sending second processed reflected signal data to a cloud backend from a second base station; sending the second processed reflected signal data from the cloud backend to the first base station; and generating modified lookup table data by the base station control unit of the first base station based at least in part on the first processed reflected signal data and the second processed reflected signal data.

In at least one example where the system includes a plurality of base stations, a method of operating the system may include: generating a modified lookup table by the beamformer control unit based on the modified lookup table data; generating by the beamformer a second set of electromagnetic sensing beams having a second set of beam characteristics, the second set of beam characteristics being determined by the beamformer control unit using the modified lookup table; and sending the second set of electromagnetic sensing beams from the at least one antenna device to a second environmental area within the field of view of the at least one antenna device.

In at least one example where the system includes a plurality of base stations, a method of operating the system may include: generating by the beamformer the first set of electromagnetic sensing beams having the first set of beam characteristics includes defining a first set of beam directions as part of the first set of beam characteristics; and generating by the beamformer the second set of electromagnetic sensing beams having the second set of beam characteristics includes defining a second set of beam directions as part of the second set of beam characteristics. In such an example, the second set of beam directions may be a subset of the first set of beam directions.

Additionally, or alternatively, a method of operating the system may include: generating by the beamformer the first set of electromagnetic sensing beams having the first set of beam characteristics includes defining a first set of beam widths as part of the first set of beam characteristics; and generating by the beamformer the second set of electromagnetic sensing beams having the second set of beam characteristics includes defining a second set of beam widths as part of the second set of beam characteristics. In such an example, the width of at least one beam in one direction in the second set of beam widths may differ from the width of at least one beam in the one direction of the first set of beam widths.

Additionally, or alternatively, a method of operating the system may include: generating by the beamformer the first set of electromagnetic sensing beams having the first set of beam characteristics includes defining a first set of beam strengths as part of the first set of beam characteristics; and generating by the beamformer the second set of electromagnetic sensing beams having the second set of beam characteristics includes defining a second set of beam strengths as part of the second set of beam characteristics. In such an example, the strength of at least one beam in one direction in the second set of beam strengths may differ from the strength of at least one beam in the one direction of the first set of beam strengths.

One or more of the embodiments encompassed herein may be advantageous in any of a variety of respects. For example latency that is introduced by having a sensing system time multiplexed with a communication system may be reduced, and the output power may be reduced, even before the communication links will be initiated. Additionally, the overall communication system setup may be able to be optimized using the sensing information of the entire environment. Since the environmental surroundings of the base station may be mapped by radar, geometrical based optimization may be performed by, for example, sub-sampling the field of view, or broadening the beam to create a coarse/fine sampling system. Further, a-priori knowledge of active links (end users connected to the base station) may be used to concentrate the scanning area around the users. Such optimization during system operation may reduce the complexity of simulation required prior to the system implementation. Moreover, for systems that are connected to the cloud backend, information may be shared within the system and optimization may be extended to several base stations in an area to provide further optimization. Sensing information of existing base stations may also be leveraged to identify over-coverage or gaps in coverage, and may also be used to provide three-dimensional environmental information that may be used for planning next generation networks.

Systems and methods are provided for performing both wireless communications and wireless sensing in combination. The systems include at least a first base station having at least one antenna device where the antenna device includes a beamformer control unit that uses a modifiable lookup table to control beam characteristics. The system may send a first set of electromagnetic sensing beams to a first environmental area within a field of view of the at least one antenna device to detect environmental objects within the environmental area. Based on data received by the antenna device, the system may generate a modified lookup table.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A system for performing both wireless communications and wireless sensing in combination, the system comprising:
at least a first base station, the first base station including at least one antenna device and at least one base station control unit coupled at least indirectly to the at least one antenna device;
wherein the at least one antenna device sends electromagnetic sensing beams to an environmental area within a field of view of the at least one antenna device to detect environmental objects within the environmental area, receives reflected sensing signals from at least a subset of the environmental objects, and transfers reflected signal data to the at least one base station control unit;
wherein the at least one antenna device includes a beamformer that includes an adjustable phase shifter and an adjustable amplifier, an antenna coupled at least indirectly to the beamformer, and a beamformer control unit coupled at least indirectly to the at least one base station control unit, to the adjustable phase shifter, and to the adjustable amplifier, the beamformer control unit including a modifiable lookup table that the beamformer control unit uses to control beam characteristics of the electromagnetic sensing beams sent by the at least one antenna device;
wherein the at least one base station control unit receives the reflected signal data, processes the reflected signal data and generates first processed reflected signal data, and sends modified lookup table data based at least in part on the first processed reflected signal data to the beamformer control unit to modify the modifiable lookup table.

2. The system of claim 1, wherein the beam characteristics include beam width, beam strength, and beam direction.

3. The system of claim 1, wherein the adjustable phase shifter is adjustable by the beamformer control unit to any of a plurality of phase settings, the plurality of phase settings including a plurality of beam directions.

4. The system of claim 1, wherein the adjustable amplifier is adjustable by the beamformer control unit to any of a plurality of amplifier settings, the amplifier settings including on, off, and a plurality of power settings that each corresponds to a beam strength.

5. The system of claim 1, wherein the modifiable lookup table has a first configuration at a first point in time, and a second configuration at a second point in time, the second configuration being based on the modified lookup table data.

6. The system of claim 5, wherein the beamformer control unit uses the first configuration of the modifiable lookup table to send a first set of the electromagnetic sensing beams in a first set of directions, and the beamformer control unit uses the second configuration of the modifiable lookup table to send a second set of the electromagnetic sensing beams in a second set of directions, wherein the second set of directions is a subset of the first set of directions.

7. The system of claim 5, wherein the beamformer control unit uses the first configuration of the modifiable lookup table to send a first set of the electromagnetic sensing beams having a first set of beam widths, and the beamformer control unit uses the second configuration of the modifiable lookup table to send a second set of the electromagnetic sensing beams having a second set of beam widths, wherein the width of at least one beam in one direction in the second set differs from the width of a beam in the one direction of the first set.

8. The system of claim 5, wherein the beamformer control unit uses the first configuration of the modifiable lookup table to send a first set of the electromagnetic sensing beams having a first set of beam strengths, and the beamformer control unit uses the second configuration of the modifiable lookup table to send a second set of the electromagnetic sensing beams having a second set of beam strengths, wherein the strength of at least one beam in one direction in the second set differs from the strength of a beam in the one direction of the first set.

9. The system of claim 1, further comprising at least a second base station and a cloud backend, the first base station and the second base station each being in communication with the cloud backend;
wherein the second base station sends second processed reflected signal data to the cloud backend, the cloud backend sends the second processed reflected signal data to the first base station, and the first base station sends the modified lookup table data to the beamformer based at least in part on the first processed reflected signal data and the second processed reflected signal data.

10. A method of operating a base station control unit in a system for performing both wireless communications and wireless sensing in combination, the method comprising:
receiving by the base station control unit reflected signal data from at least one antenna device of a base station, the base station control unit being coupled at least indirectly to the at least one antenna device, wherein the at least one antenna device sends electromagnetic sensing beams to an environmental area within a field of view of the at least one antenna device to detect environmental objects within the environmental area, and receives reflected sensing signals from at least a subset of the environmental objects;
processing by the base station control unit the reflected signal data and generating first processed reflected signal data; and
sending, from the base station control unit to a beamformer control unit, lookup table data based at least in part on the first processed reflected signal data, wherein the lookup table data is used by the beamformer control unit to control beam characteristics of the electromagnetic sensing beams sent by the at least one antenna device.

11. A method of operating a system for performing both wireless communications and wireless sensing in combination, wherein the system comprises at least a first base station, the first base station including at least one antenna device and at least one base station control unit coupled at least indirectly to the at least one antenna device, wherein the at least one antenna device includes a beamformer that includes an adjustable phase shifter and an adjustable amplifier, an antenna coupled at least indirectly to the beamformer, and a beamformer control unit coupled at least indirectly to the at least one base station control unit and each of the adjustable phase shifter and the adjustable amplifier, the beamformer control unit including a modifiable lookup table, the method comprising:
generating by the beamformer a first set of electromagnetic sensing beams having a first set of beam characteristics, the first set of beam characteristics being determined by the beamformer control unit using the modifiable lookup table;
sending the first set of electromagnetic sensing beams from the at least one antenna device to a first environmental area within a field of view of the at least one antenna device to detect environmental objects within the environmental area;
receiving reflected sensing signals by the at least one antenna device from at least a subset of the environmental objects;
transferring reflected signal data from the at least one antenna device to the base station control unit;
generating first processed reflected signal data by processing the reflected signal data by the base station control unit;
generating modified lookup table data based at least in part on the first processed reflected signal data by the base station control unit.

12. The method of claim 11, further comprising:
generating a modified lookup table by the beamformer control unit based on the modified lookup table data;
generating by the beamformer a second set of electromagnetic sensing beams having a second set of beam characteristics, the second set of beam characteristics being determined by the beamformer control unit using the modified lookup table;
sending the second set of electromagnetic sensing beams from the at least one antenna device to a second environmental area within the field of view of the at least one antenna device.

13. The method of claim 12, wherein:
generating by the beamformer the first set of electromagnetic sensing beams having the first set of beam characteristics includes defining a first set of beam directions as part of the first set of beam characteristics; and
generating by the beamformer the second set of electromagnetic sensing beams having the second set of beam characteristics includes defining a second set of beam directions as part of the second set of beam characteristics;
wherein the second set of beam directions is a subset of the first set of beam directions.

14. The method of claim 12, wherein:
generating by the beamformer the first set of electromagnetic sensing beams having the first set of beam characteristics includes defining a first set of beam widths as part of the first set of beam characteristics; and
generating by the beamformer the second set of electromagnetic sensing beams having the second set of beam characteristics includes defining a second set of beam widths as part of the second set of beam characteristics;

wherein the width of at least one beam in one direction in the second set of beam widths differs from the width of at least one beam in the one direction of the first set of beam widths.

15. The method of claim 12, wherein:
generating by the beamformer the first set of electromagnetic sensing beams having the first set of beam characteristics includes defining a first set of beam strengths as part of the first set of beam characteristics; and
generating by the beamformer the second set of electromagnetic sensing beams having the second set of beam characteristics includes defining a second set of beam strengths as part of the second set of beam characteristics;
wherein the strength of at least one beam in one direction in the second set of beam strengths differs from the strength of at least one beam in the one direction of the first set of beam strengths.

16. The method of claim 12, further comprising:
sending second processed reflected signal data to a cloud backend from a second base station;
sending the second processed reflected signal data from the cloud backend to the first base station; and
generating modified lookup table data by the base station control unit of the first base station based at least in part on the first processed reflected signal data and the second processed reflected signal data.

17. The method of claim 16, further comprising:
generating a modified lookup table by the beamformer control unit based on the modified lookup table data;
generating by the beamformer a second set of electromagnetic sensing beams having a second set of beam characteristics, the second set of beam characteristics being determined by the beamformer control unit using the modified lookup table;
sending the second set of electromagnetic sensing beams from the at least one antenna device to a second environmental area within the field of view of the at least one antenna device.

18. The method of claim 17, wherein:
generating by the beamformer the first set of electromagnetic sensing beams having the first set of beam characteristics includes defining a first set of beam directions as part of the first set of beam characteristics; and
generating by the beamformer the second set of electromagnetic sensing beams having the second set of beam characteristics includes defining a second set of beam directions as part of the second set of beam characteristics;
wherein the second set of beam directions is a subset of the first set of beam directions.

19. The method of claim 17, wherein:
generating by the beamformer the first set of electromagnetic sensing beams having the first set of beam characteristics includes defining a first set of beam widths as part of the first set of beam characteristics; and
generating by the beamformer the second set of electromagnetic sensing beams having the second set of beam characteristics includes defining a second set of beam widths as part of the second set of beam characteristics;
wherein the width of at least one beam in one direction in the second set of beam widths differs from the width of at least one beam in the one direction of the first set of beam widths.

20. The method of claim 17, wherein:
generating by the beamformer the first set of electromagnetic sensing beams having the first set of beam characteristics includes defining a first set of beam strengths as part of the first set of beam characteristics; and
generating by the beamformer the second set of electromagnetic sensing beams having the second set of beam characteristics includes defining a second set of beam strengths as part of the second set of beam characteristics;
wherein the strength of at least one beam in one direction in the second set of beam strengths differs from the strength of at least one beam in the one direction of the first set of beam strengths.

* * * * *